United States Patent
Fukutomi et al.

(10) Patent No.: US 10,366,003 B2
(45) Date of Patent: Jul. 30, 2019

(54) CONTROLLER, STORAGE DEVICE, AND COMPUTER PROGRAM PRODUCT FOR WRITING AND TRANSFER PROCESS

(71) Applicant: TOSHIBA MEMORY CORPORATION, Minato-ku (JP)

(72) Inventors: Kazuhiro Fukutomi, Kanagawa (JP); Shinichi Kanno, Tokyo (JP); Shigehiro Asano, Kanagawa (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 0 days.

(21) Appl. No.: 15/215,154

(22) Filed: Jul. 20, 2016

(65) Prior Publication Data

US 2017/0004070 A1    Jan. 5, 2017

Related U.S. Application Data

(63) Continuation of application No. 13/603,989, filed on Sep. 5, 2012, now abandoned.

(30) Foreign Application Priority Data

Dec. 28, 2011   (JP) .................................. 2011-289304

(51) Int. Cl.
*G06F 12/00* (2006.01)
*G06F 12/02* (2006.01)
(Continued)

(52) U.S. Cl.
CPC .......... *G06F 12/0246* (2013.01); *G06F 12/02* (2013.01); *G06F 12/0802* (2013.01);
(Continued)

(58) Field of Classification Search
None
See application file for complete search history.

(56) References Cited

U.S. PATENT DOCUMENTS 7,797,064 B2 * 9/2010 Loomis .................. G11B 20/10
                                                         700/94
8,392,476 B2    3/2013 Asano et al.
(Continued)

FOREIGN PATENT DOCUMENTS

JP    2004-310477 A    11/2004
JP    2006-228394 A     8/2006
(Continued)

OTHER PUBLICATIONS

"A 5.6MB/s64Gb 4b/Cell NAND Flash Memory in 43nm CMOS", Solid-State Circuits Conference, Digest of Technical Papers, ISSCC, IEEE International, Feb. 8-12, 2009, 40 pages.
(Continued)

*Primary Examiner* — David Yi
*Assistant Examiner* — Craig S Goldschmidt
(74) *Attorney, Agent, or Firm* — Oblon, McClelland, Maier & Neustadt, L.L.P.

(57) ABSTRACT

According to an embodiment, a controller is connected to an external storage device and controls access to a semiconductor storage device including blocks each including memory cell groups each having memory cells. The block includes pages associated with each memory cell group. A writing process for each memory cell group includes writing stages. The controller includes a determining unit configured to determine data to be transferred to the page required in the writing process for a first memory cell group before the writing stage first starts when the writing stage is performed; a reading unit configured to read the determined data from the semiconductor storage device and to store the read data in the external storage device before the writing stage starts; and a writing unit configured to perform the writing process using the data stored in the external storage device when the writing stage is performed.

15 Claims, 13 Drawing Sheets

(51) Int. Cl.
*G06F 12/0873* (2016.01)
*G06F 12/0802* (2016.01)
*G06F 12/0868* (2016.01)
*G06F 12/0871* (2016.01)
*G06F 12/0855* (2016.01)

(52) U.S. Cl.
CPC ...... *G06F 12/0859* (2013.01); *G06F 12/0868* (2013.01); *G06F 12/0871* (2013.01); *G06F 12/0873* (2013.01); *G06F 2212/604* (2013.01); *G06F 2212/7202* (2013.01); *G06F 2212/7203* (2013.01)

(56) References Cited

U.S. PATENT DOCUMENTS

| | | | |
|---|---|---|---|
| 8,495,336 | B2 | 7/2013 | Fukutomi et al. |
| 8,832,357 | B2 | 9/2014 | Yao et al. |
| 2005/0055531 | A1* | 3/2005 | Asami ............... G06F 12/0246 711/203 |
| 2006/0285397 | A1 | 12/2006 | Nishihara |
| 2009/0037456 | A1* | 2/2009 | Kirshenbaum ... G06F 17/30097 |
| 2009/0327803 | A1 | 12/2009 | Fukutomi et al. |
| 2010/0037009 | A1 | 2/2010 | Yano et al. |
| 2010/0064111 | A1 | 3/2010 | Kunimatsu et al. |
| 2010/0082878 | A1 | 4/2010 | Inoue et al. |
| 2010/0146228 | A1 | 6/2010 | Kanno et al. |
| 2010/0161884 | A1 | 6/2010 | Kurashige |
| 2010/0180069 | A1 | 7/2010 | Yeh |
| 2010/0241819 | A1 | 9/2010 | Yoshii et al. |
| 2010/0325498 | A1 | 12/2010 | Nagadomi |
| 2011/0022779 | A1 | 1/2011 | Lund et al. |
| 2011/0072187 | A1 | 3/2011 | Forhan et al. |
| 2011/0099349 | A1 | 4/2011 | Yano |
| 2011/0191534 | A1 | 8/2011 | Ash |
| 2011/0202578 | A1 | 8/2011 | Asano et al. |
| 2011/0214033 | A1 | 9/2011 | Yoshii et al. |
| 2011/0231624 | A1 | 9/2011 | Fukutomi et al. |
| 2012/0079167 | A1 | 3/2012 | Yao et al. |
| 2012/0278533 | A1 | 11/2012 | Suzuki et al. |
| 2013/0297900 | A1 | 11/2013 | Fukutomi et al. |
| 2014/0379968 | A1 | 12/2014 | Yao et al. |
| 2015/0067087 | A1* | 3/2015 | Guerin ............ G06F 15/17331 709/212 |

FOREIGN PATENT DOCUMENTS

| | | |
|---|---|---|
| JP | 2011-165063 | 8/2011 |
| JP | 2011-192260 | 9/2011 |
| JP | 2011-197945 | 10/2011 |
| JP | 2012-68986 | 4/2012 |

OTHER PUBLICATIONS

Office Action dated Sep. 9, 2014 in Japanese Patent Application No. 2011-289304 (with English language translation).

Jung et al, "Architecture Exploration of Flash Memory Storage Controller through a Cycle Accurate Profiling", Nov. 2011, IEEE Transactions on Consumer Electronics, vol. 57, No. 4, pp. 1756-1764.

* cited by examiner

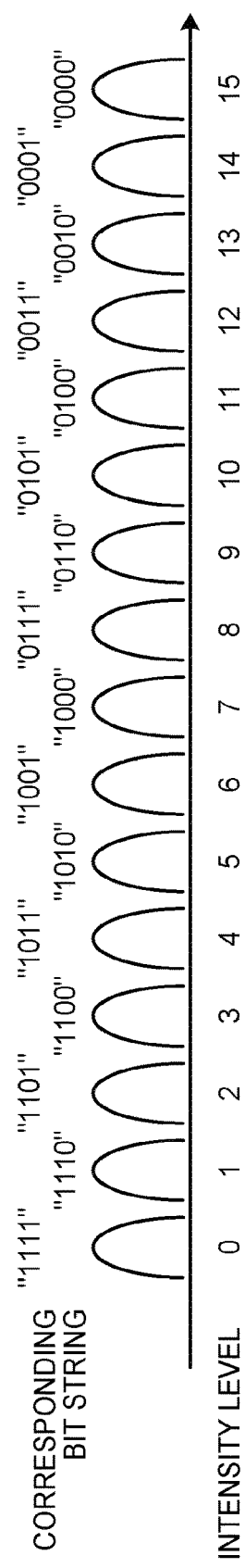

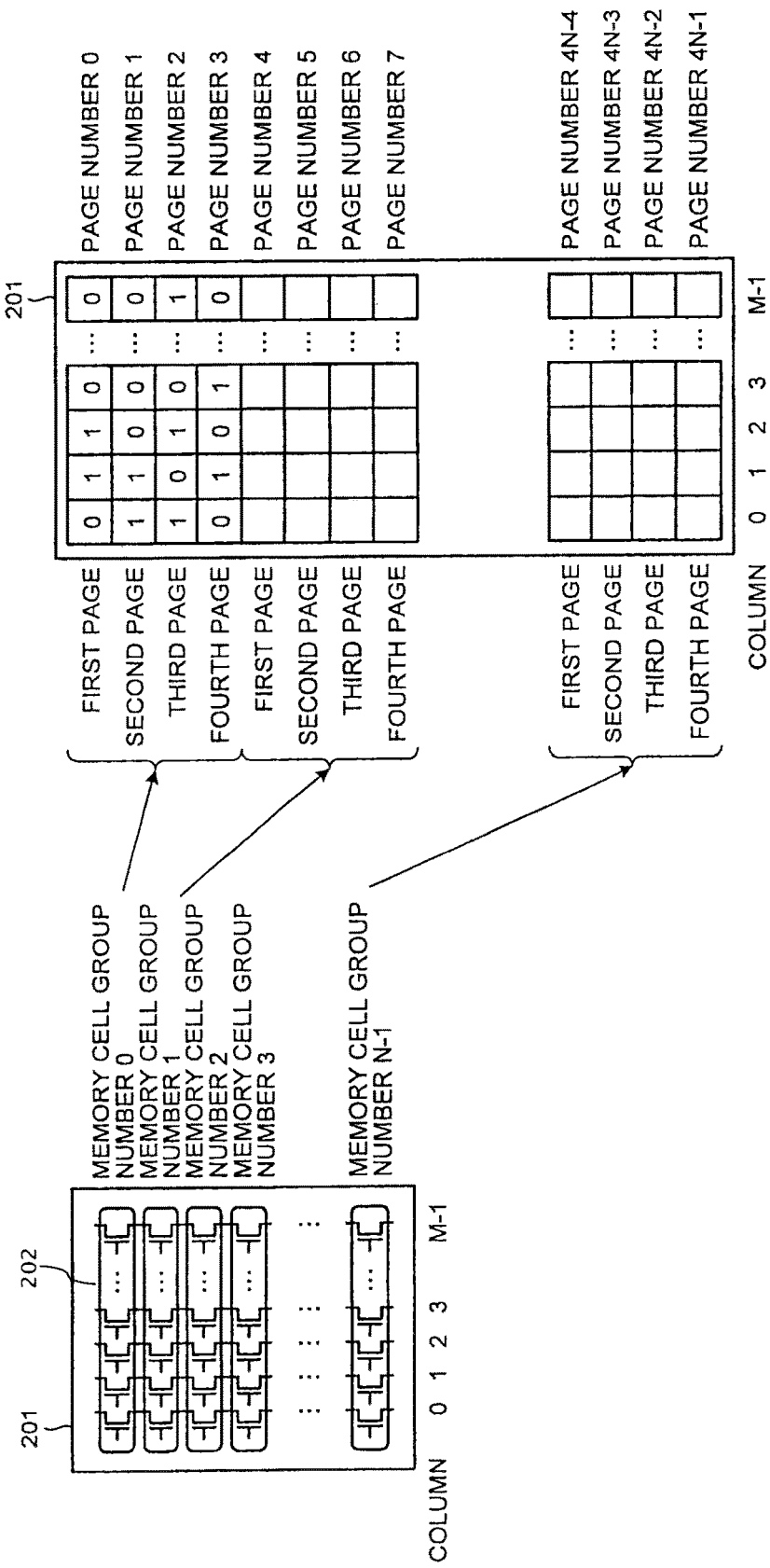

FIG.5

|  | FIRST STAGE | SECOND STAGE | THIRD STAGE |
|---|---|---|---|
| MEMORY CELL GROUP NUMBER 0 | MEMORY CELL GROUP NUMBER 0-FIRST PAGE MEMORY CELL GROUP NUMBER 1-FIRST PAGE | MEMORY CELL GROUP NUMBER 0-SECOND PAGE MEMORY CELL GROUP NUMBER 0-THIRD PAGE | MEMORY CELL GROUP NUMBER 0-THIRD PAGE MEMORY CELL GROUP NUMBER 0-FOURTH PAGE |
| MEMORY CELL GROUP NUMBER 1 | MEMORY CELL GROUP NUMBER 1-FIRST PAGE MEMORY CELL GROUP NUMBER 2-FIRST PAGE | MEMORY CELL GROUP NUMBER 1-SECOND PAGE MEMORY CELL GROUP NUMBER 1-THIRD PAGE | MEMORY CELL GROUP NUMBER 1-THIRD PAGE MEMORY CELL GROUP NUMBER 1-FOURTH PAGE |
| MEMORY CELL GROUP NUMBER 2 | MEMORY CELL GROUP NUMBER 2-FIRST PAGE MEMORY CELL GROUP NUMBER 3-FIRST PAGE | MEMORY CELL GROUP NUMBER 2-SECOND PAGE MEMORY CELL GROUP NUMBER 2-THIRD PAGE | MEMORY CELL GROUP NUMBER 2-THIRD PAGE MEMORY CELL GROUP NUMBER 2-FOURTH PAGE |

FIG.6

|  | FIRST STAGE | SECOND STAGE | THIRD STAGE |
|---|---|---|---|
| MEMORY CELL GROUP NUMBER 0 | 1 | 3 | 6 |
| MEMORY CELL GROUP NUMBER 1 | 2 | 5 | 9 |
| MEMORY CELL GROUP NUMBER 2 | 4 | 8 | 12 |

FIG.7

|  | BLOCK NUMBER | PAGE NUMBER | PAGE OFFSET |
|---|---|---|---|
| LOGICAL ADDRESS 0 | 1 | 0 | 0 |
| LOGICAL ADDRESS 1 | 2 | 3 | 1 |
| LOGICAL ADDRESS 2 | 1 | 5 | 1 |
| LOGICAL ADDRESS 3 | 0 | 2 | 1 |
| LOGICAL ADDRESS 4 | 2 | 4 | 0 |
| LOGICAL ADDRESS 5 | 2 | 0 | 0 |
| LOGICAL ADDRESS 6 | 2 | 1 | 1 |
| LOGICAL ADDRESS 7 | 2 | 5 | 0 |
| LOGICAL ADDRESS 8 | 2 | 2 | 1 |
| LOGICAL ADDRESS 9 | 1 | 4 | 1 |

FIG.8

| MEMORY CELL GROUP NUMBER | FIRST STAGE | | | | | SECOND STAGE | | | | | THIRD STAGE | | | | |
|---|---|---|---|---|---|---|---|---|---|---|---|---|---|---|---|
| | TARGET PAGE | TRANSFER SOURCE ADDRESS INFORMATION | | | | TARGET PAGE | TRANSFER SOURCE ADDRESS INFORMATION | | | | TARGET PAGE | TRANSFER SOURCE ADDRESS INFORMATION | | | |
| | | LOGICAL ADDRESS INFORMATION | BLOCK NUMBER | PAGE NUMBER | PAGE OFFSET | | LOGICAL ADDRESS INFORMATION | BLOCK NUMBER | PAGE NUMBER | PAGE OFFSET | | LOGICAL ADDRESS INFORMATION | BLOCK NUMBER | PAGE NUMBER | PAGE OFFSET |
| 0 | 0-FIRST PAGE | 5 | 0 | 0 | 0 | 0-SECOND PAGE | 3 | 0 | 2 | 0 | 0-THIRD PAGE | 123 | 0 | 3 | 1 |
| | | 48 | 0 | 1 | 1 | | 16 | 0 | 2 | 1 | | 27 | 0 | 4 | 1 |
| | 1-FIRST PAGE | 5 | 0 | 0 | 0 | 0-THIRD PAGE | 123 | 0 | 3 | 1 | 0-FOURTH PAGE | 324 | 0 | 6 | 0 |
| | | 48 | 0 | 1 | 1 | | 27 | 0 | 4 | 1 | | 65 | 0 | 7 | 0 |
| 1 | 1-FIRST PAGE | 5 | 0 | 0 | 0 | 1-SECOND PAGE | 7 | 0 | 9 | 1 | 1-THIRD PAGE | 11 | 0 | 13 | 1 |
| | | 48 | 0 | 1 | 1 | | 56 | 0 | 11 | 0 | | 75 | 0 | 14 | 0 |
| | 2-FIRST PAGE | 22 | 0 | 7 | 1 | 1-THIRD PAGE | 11 | 0 | 13 | 1 | 1-FOURTH PAGE | 760 | 0 | 16 | 0 |
| | | 373 | 0 | 8 | 0 | | 75 | 0 | 14 | 0 | | 273 | 0 | 17 | 1 |

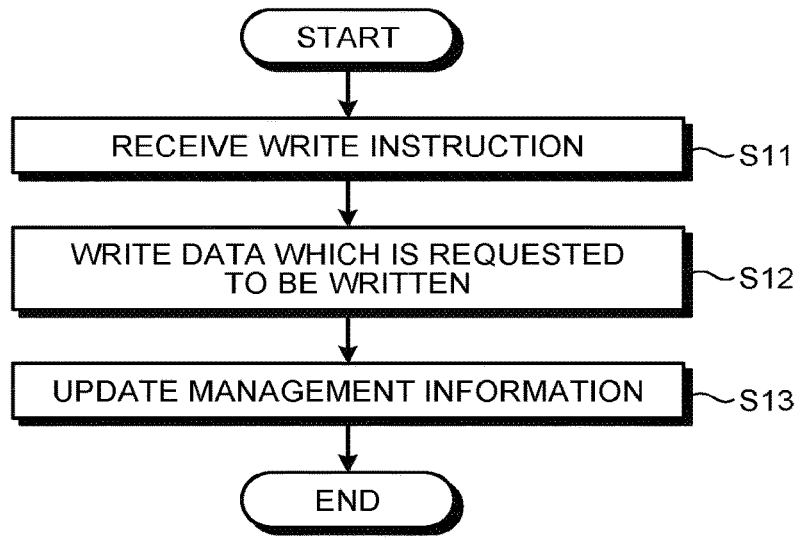
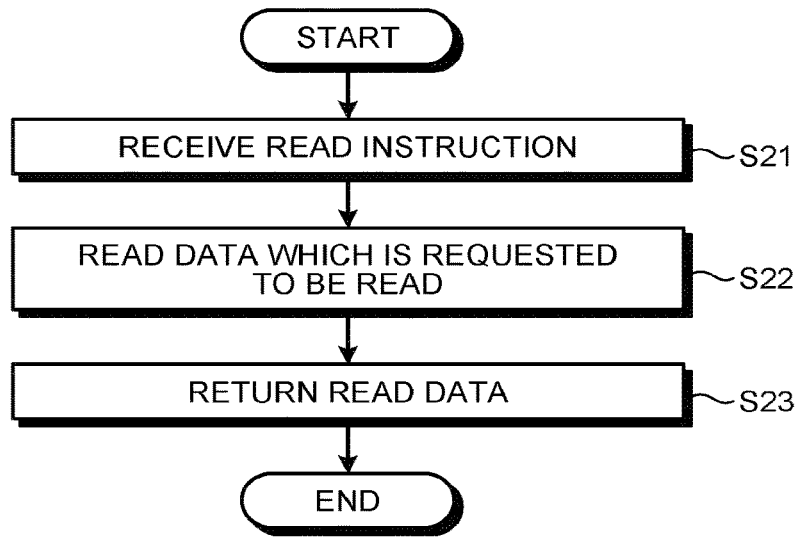

FIG.12

|  | FIRST STAGE | SECOND STAGE | THIRD STAGE |
|---|---|---|---|
| MEMORY CELL GROUP NUMBER 0 | MEMORY CELL GROUP NUMBER 0-FIRST PAGE MEMORY CELL GROUP NUMBER 0-SECOND PAGE MEMORY CELL GROUP NUMBER 0-THIRD PAGE MEMORY CELL GROUP NUMBER 0-FOURTH PAGE | MEMORY CELL GROUP NUMBER 0-FIRST PAGE MEMORY CELL GROUP NUMBER 0-SECOND PAGE MEMORY CELL GROUP NUMBER 0-THIRD PAGE MEMORY CELL GROUP NUMBER 0-FOURTH PAGE | MEMORY CELL GROUP NUMBER 0-FIRST PAGE MEMORY CELL GROUP NUMBER 0-SECOND PAGE MEMORY CELL GROUP NUMBER 0-THIRD PAGE MEMORY CELL GROUP NUMBER 0-FOURTH PAGE |
| MEMORY CELL GROUP NUMBER 1 | MEMORY CELL GROUP NUMBER 1-FIRST PAGE MEMORY CELL GROUP NUMBER 1-SECOND PAGE MEMORY CELL GROUP NUMBER 1-THIRD PAGE MEMORY CELL GROUP NUMBER 1-FOURTH PAGE | MEMORY CELL GROUP NUMBER 1-FIRST PAGE MEMORY CELL GROUP NUMBER 1-SECOND PAGE MEMORY CELL GROUP NUMBER 1-THIRD PAGE MEMORY CELL GROUP NUMBER 1-FOURTH PAGE | MEMORY CELL GROUP NUMBER 1-FIRST PAGE MEMORY CELL GROUP NUMBER 1-SECOND PAGE MEMORY CELL GROUP NUMBER 1-THIRD PAGE MEMORY CELL GROUP NUMBER 1-FOURTH PAGE |
| MEMORY CELL GROUP NUMBER 2 | MEMORY CELL GROUP NUMBER 2-FIRST PAGE MEMORY CELL GROUP NUMBER 2-SECOND PAGE MEMORY CELL GROUP NUMBER 2-THIRD PAGE MEMORY CELL GROUP NUMBER 2-FOURTH PAGE | MEMORY CELL GROUP NUMBER 2-FIRST PAGE MEMORY CELL GROUP NUMBER 2-SECOND PAGE MEMORY CELL GROUP NUMBER 2-THIRD PAGE MEMORY CELL GROUP NUMBER 2-FOURTH PAGE | MEMORY CELL GROUP NUMBER 2-FIRST PAGE MEMORY CELL GROUP NUMBER 2-SECOND PAGE MEMORY CELL GROUP NUMBER 2-THIRD PAGE MEMORY CELL GROUP NUMBER 2-FOURTH PAGE |

FIG.13

|  | FIRST STAGE | SECOND STAGE | THIRD STAGE |
|---|---|---|---|
| MEMORY CELL GROUP NUMBER 0 | 1 | 3 | 6 |
| MEMORY CELL GROUP NUMBER 1 | 2 | 5 | 9 |
| MEMORY CELL GROUP NUMBER 2 | 4 | 8 | 12 |

FIG.14

|  | FIRST STAGE | SECOND STAGE | THIRD STAGE |
|---|---|---|---|
| MEMORY CELL GROUP NUMBER 0 | MEMORY CELL GROUP NUMBER 0-FIRST PAGE MEMORY CELL GROUP NUMBER 0-SECOND PAGE MEMORY CELL GROUP NUMBER 0-THIRD PAGE | MEMORY CELL GROUP NUMBER 0-FIRST PAGE MEMORY CELL GROUP NUMBER 0-SECOND PAGE MEMORY CELL GROUP NUMBER 0-THIRD PAGE | MEMORY CELL GROUP NUMBER 0-FIRST PAGE MEMORY CELL GROUP NUMBER 0-SECOND PAGE MEMORY CELL GROUP NUMBER 0-THIRD PAGE |
| MEMORY CELL GROUP NUMBER 1 | MEMORY CELL GROUP NUMBER 1-FIRST PAGE MEMORY CELL GROUP NUMBER 1-SECOND PAGE MEMORY CELL GROUP NUMBER 1-THIRD PAGE | MEMORY CELL GROUP NUMBER 1-FIRST PAGE MEMORY CELL GROUP NUMBER 1-SECOND PAGE MEMORY CELL GROUP NUMBER 1-THIRD PAGE | MEMORY CELL GROUP NUMBER 1-FIRST PAGE MEMORY CELL GROUP NUMBER 1-SECOND PAGE MEMORY CELL GROUP NUMBER 1-THIRD PAGE |
| MEMORY CELL GROUP NUMBER 2 | MEMORY CELL GROUP NUMBER 2-FIRST PAGE MEMORY CELL GROUP NUMBER 2-SECOND PAGE MEMORY CELL GROUP NUMBER 2-THIRD PAGE | MEMORY CELL GROUP NUMBER 2-FIRST PAGE MEMORY CELL GROUP NUMBER 2-SECOND PAGE MEMORY CELL GROUP NUMBER 2-THIRD PAGE | MEMORY CELL GROUP NUMBER 2-FIRST PAGE MEMORY CELL GROUP NUMBER 2-SECOND PAGE MEMORY CELL GROUP NUMBER 2-THIRD PAGE |

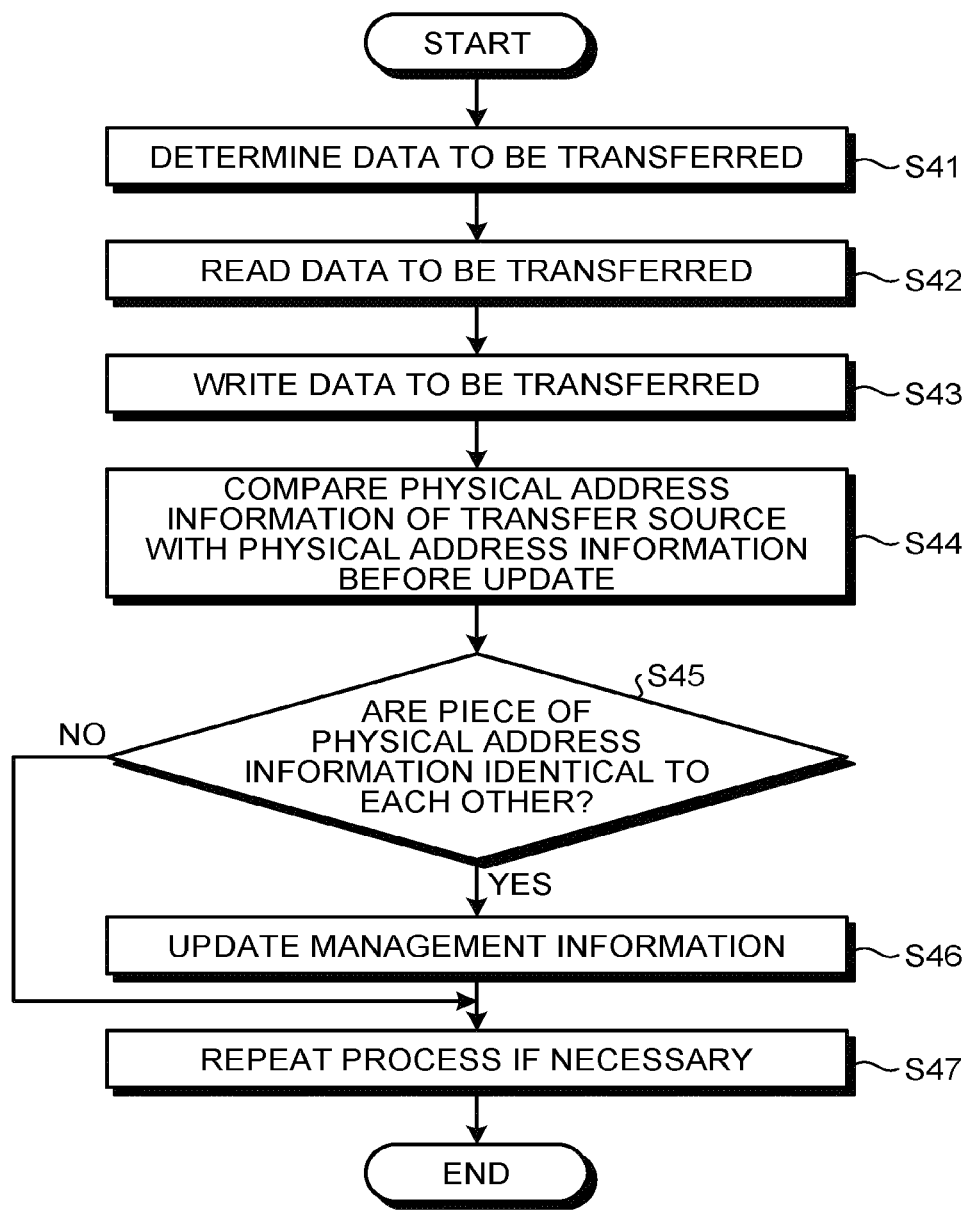

ions is a continuation application of U.S. application Ser. No. 13/603,989, filed on Sep. 5, 2012, which claims the benefit of priority from Japanese Patent Application No. 2011-289304, filed on Dec. 28, 2011, the entire contents of each of which are incorporated herein by reference.

CONTROLLER, STORAGE DEVICE, AND COMPUTER PROGRAM PRODUCT FOR WRITING AND TRANSFER PROCESS

CROSS-REFERENCE TO RELATED APPLICATION

This application is a continuation application of U.S. application Ser. No. 13/603,989, filed on Sep. 5, 2012, which claims the benefit of priority from Japanese Patent Application No. 2011-289304, filed on Dec. 28, 2011, the entire contents of each of which are incorporated herein by reference.

FIELD

Embodiments described herein relate generally to a controller, a storage device, and a computer program product.

BACKGROUND

When a semiconductor storage medium, such as a NAND flash memory, is used to form a storage device, a transfer process (a compaction process or a garbage collection process) is performed.

In the semiconductor storage medium, such as a NAND flash memory, data is input and output in the unit of pages associated with an internal memory cell group. In the semiconductor storage medium, in order to complete the writing of data to the memory cell group, it is necessary to perform a plurality of writing stages, the order in which data is written to the memory cell group in each writing stage is defined, or the association of data required in each writing stage is defined.

In order to achieve the transfer process in the semiconductor storage medium, necessary data needs to be prepared at an appropriate timing and a reading and writing process needs to be performed for the semiconductor storage medium in an appropriate order.

BRIEF DESCRIPTION OF THE DRAWINGS

FIG. 3 is a diagram illustrating the correspondence between information stored in a memory cell and an intensity level;

FIG. 4 is a diagram illustrating the correspondence between a memory cell group and a page;

FIG. 5 is a diagram illustrating an example of the page, which is a write target in a writing stage;

FIG. 6 is a diagram illustrating an example of a writing order;

FIG. 7 is a diagram illustrating an example of the structure of an address mapping table;

FIG. 8 is a diagram illustrating an example of the structure of transfer position information;

FIG. 9 is a flowchart illustrating a writing process according to the first embodiment;

FIG. 10 is a flowchart illustrating a read process according to the first embodiment;

FIG. 12 is a diagram illustrating another example of the page, which is a write target in the writing stage;

FIG. 13 is a diagram illustrating another example of the writing order;

FIG. 14 is a diagram illustrating another example of the page, which is a write target in the writing stage;

FIG. 16 is a flowchart illustrating a transfer process according to the second embodiment.

DETAILED DESCRIPTION

According to an embodiment, a controller is connected to an external storage device storing data and controls access to a semiconductor storage device including a plurality of blocks each of which includes N (N is an integer equal to or greater than 2) memory cell groups each having a plurality of memory cells. The block includes a plurality of pages. The page is a predetermined unit storage area. A plurality of pages are associated with each of the memory cell groups. A writing process for each of the memory cell groups includes P (P is an integer equal to or greater than 2) writing stages each of which is a unit process of writing data to the memory cell group. At least one of the pages required in the writing process for the memory cell group which is a write target is predetermined in each of the writing stages. The writing stages are performed in a predetermined order. The controller includes a determining unit configured to determine data to be transferred to the page which is required in the writing process for a first memory cell group of the memory cell groups before the writing stage (in which the page required in the writing process for the first memory cell group becomes necessary for the first time when the writing stage is performed in a predetermined order) starts; a reading unit configured to read the determined data from the semiconductor storage device and to store the read data in the external storage device before the writing stage starts; and a writing unit configured to perform the writing stage of the first memory cell group using the data stored in the external storage device as data for the page required in the writing stage of the first memory cell group when the writing stage is performed.

Hereinafter, a controller, a storage device, and a computer program product according to exemplary embodiments of the invention will be described in detail with reference to the accompanying drawings. In the following embodiments, a solid state drive (SSD) is used as the storage device, but the storage device is not limited thereto.

First Embodiment

A storage device according to a first embodiment generates the transfer position information of arbitrary transfer target data before an arbitrary writing stage (in which the transfer target data is required for the first time) of an arbitrary memory cell group starts, and transfers data according to the generated transfer position information. In the storage device according to the first embodiment, the writing of data to the memory cell group is completed at the time when a plurality of writing processes are performed. Each of a plurality of (P; P is an integer equal to or greater than 2) writing processes is referred to as a writing stage. The transfer position information means information in which the position information of transfer source data is associated with the position information of a transfer destination (which will be described in detail below).

Figure 1:
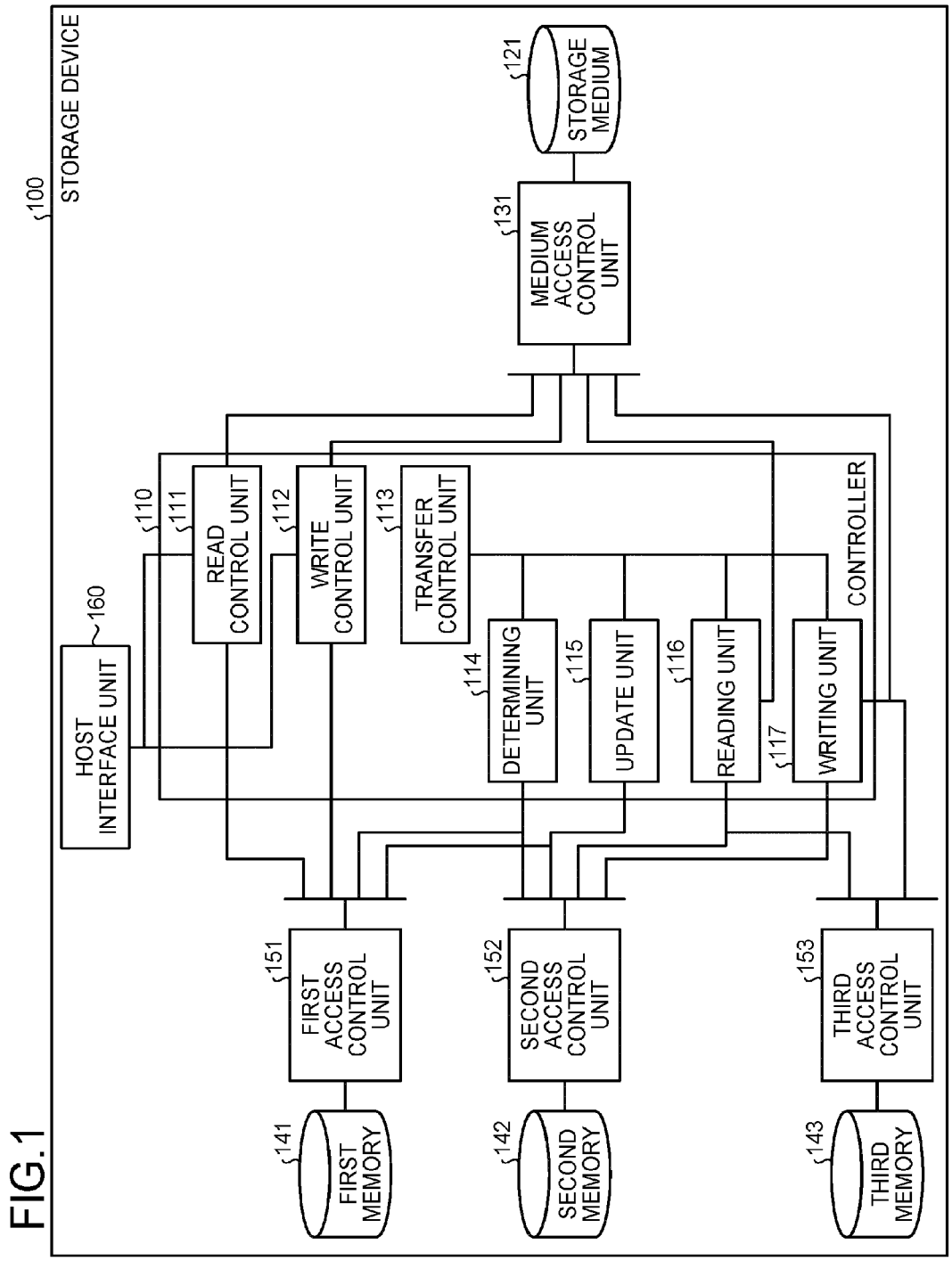
FIG. 1 is a block diagram illustrating a storage device according to a first embodiment.

FIG. 1 is a block diagram illustrating an example of the outline of the functional structure of a storage device 100 according to the first embodiment. As illustrated in FIG. 1, the storage device 100 includes a controller 110, a first access control unit 151, a first memory 141, a second access control unit 152, a second memory 142, a third access control unit 153, a third memory 143, a medium access control unit 131, a storage medium 121, and a host interface unit 160.

The controller 110 includes a read control unit 111, a write control unit 112, a transfer control unit 113, a determining unit 114, an update unit 115, a reading unit 116, and a writing unit 117.

Figure 2:
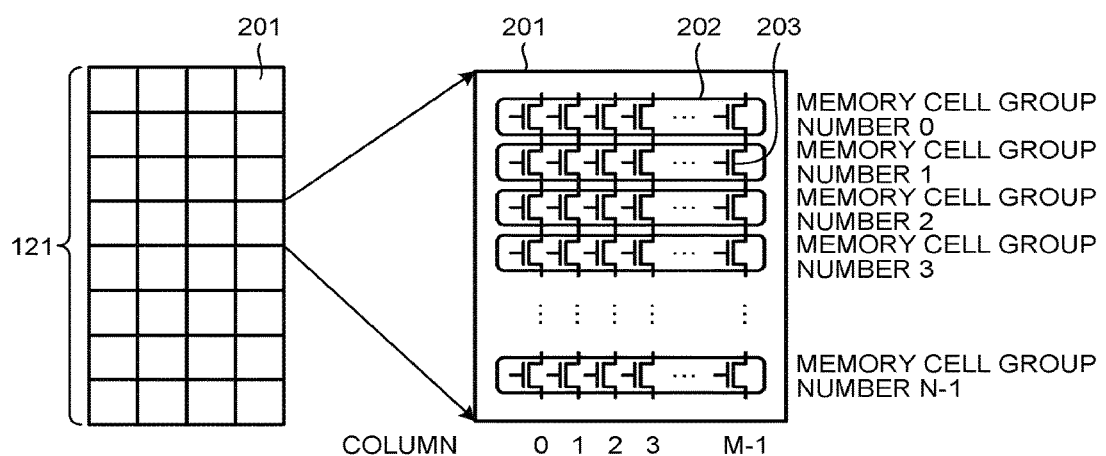
FIG. 2 is a diagram illustrating an example of the structure of a storage medium.

A storage medium 121 is a semiconductor storage medium (semiconductor memory device), such as a NAND flash memory. FIG. 2 is a diagram illustrating an example of the structure of the storage medium 121. As illustrated in FIG. 2, the storage medium 121 includes a plurality of blocks 201. The block 201 is a unit of data reading and writing, such as a unit of deletion in the storage medium 121. As illustrated in FIG. 2, each block 201 includes a plurality of (N; N is an integer equal to or greater than 2) memory cell groups 202. The memory cell group 202 is a unit of data input/output for the storage medium 121. Each memory cell group 202 includes a plurality of (M; M is an integer equal to or greater than 2) memory cells 203. A memory cell group number is set in order to identify the memory cell group 202 included in the block 201. A column number is set in order to identify the memory cell 203 included in the memory cell group 202.

The memory cell 203 is configured to store therein multi-valued information. FIG. 3 is a diagram illustrating an example of the correspondence between information (bit string) stored in the memory cell 203 and an intensity level. For example, when 4-bit (4 bits per cell) information is stored in each cell, charge with any one of 16 intensity levels is stored in the memory cell 203, as illustrated in FIG. 3. In addition, the 4-bit strings are associated with intensity levels, respectively, according to a predetermined rule. FIG. 3 illustrates an example of the association between the bit strings.

One or more pages are associated with the memory cell group 202. The page is a unit of data input/output between the storage medium 121 and the outside. FIG. 4 is a diagram illustrating an example of the correspondence between the memory cell group 202 and the page. For example, when four pages correspond to one memory cell group 202, four pages, that is, a first page, a second page, a third page, and a fourth page correspond to each memory cell group 202, as illustrated in FIG. 4. In addition, as show in FIG. 4, a page number is given to each page of the block 201.

Data for the page is associated with the bit string which is associated with the intensity level recorded in the memory cell group 202 according to the predetermined rule. For example, when the four pages correspond to one memory cell group 202, pieces of data for the first page, the second page, the third page, and the fourth page are associated with the first, second, third, and fourth bit, respectively, from the leftmost of the bit string associated with an intensity level which is recorded in each memory cell 203 of the memory cell group 202. In the example of the memory cell group 202 with memory cell group number 0 in FIG. 4, the bits of column 1 of the four pages are 1, 1, 0, and 1, respectively, in the order of the first page, the second page, the third page, and the fourth page. Therefore, in the case of the association between the bit strings illustrated in FIG. 3, intensity level 2 corresponding to a bit string of "1101" is recorded in the memory cell 203 of column 1 in the memory cell group 202 with memory cell group number 0. In addition, the rule for the association between the pieces of page data and the bit strings associated with the intensity levels recorded in each memory cell 203 of the memory cell group 202 is not limited thereto.

There are the following three restrictions (1) to (3) in the writing process (writing sequence) for the storage medium 121.

(1) A plurality of writing stages are performed on a given memory cell group 202 to complete the writing sequence for the memory cell group 202. For example, when three writing stages are needed to complete the writing sequence for a given memory cell group 202, the first, second, and third writing stages are performed to complete the writing of information to the memory cell group 202. The number of writing stages required to complete the writing sequence may be the same or different for each block 201 of the storage medium 121. In addition, the number of writing stages required to complete the writing sequence may be the same or different for each memory cell group 202 of a given block 201.

(2) In each writing stage, data for one or more pages including zero or more pages among one or more pages associated with the memory cell group 202 is needed in the writing process in each writing stage. FIG. 5 is a diagram illustrating an example of the page (page to be written (target page)) required in the writing process in each writing stage. In FIG. 5, for example, in the first stage of the memory cell group 202 with memory cell group number 1, the first page of the memory cell group 202 with memory cell group number 1 and the first page of the memory cell group 202 with memory cell group number 2 are the target pages. In the third writing stage of the memory cell group 202 with memory cell group number 2, the third page of the memory cell group 202 of the memory cell group number 2 and the fourth page of the memory cell group 202 of the memory cell group number 2 are the target pages. As illustrated in FIG. 5, the target pages of a plurality of writing stages may include the same page or the page associated with a memory cell group 202 different from the memory cell group 202, which is a write target. In addition, the target page of each writing stage may be the same or different for each block 201 of the storage medium 121.

(3) The writing stages of the memory cell groups 202 in a given block 201 are performed in a predetermined order. FIG. 6 is a diagram illustrating an example of the writing order. In FIG. 6, for example, after the first stage of the memory cell group 202 with memory cell group number 0 is performed, the first stage of the memory cell group 202 with memory cell group number 1 and the second stage of the memory cell group 202 with memory cell group number 0 need to be sequentially performed. As illustrated in FIG. 6, between a given writing stage and the next writing stage of a given memory cell group 202, a given writing stage of another memory cell group 202 may be interposed. In addition, the writing order may be the same or different for each block 201 of the storage medium 121.

Returning to FIG. 1, the medium access control unit 131 receives an instruction to read data from the storage medium 121 from a requester, reads data corresponding to the read instruction from the storage medium 121, and returns the read data to the requester. In addition, the medium access control unit 131 receives an instruction to write data to the storage medium 121 from the requester and writes data corresponding to the write instruction to the storage medium 121.

The first memory 141 functions as a management information storage unit that stores management information.

The management information includes, for example, an address mapping table. In addition, the management information may separately include information which can be derived from information in the address mapping table in order to simplify the various subsequent processes. In the various subsequent processes, in order to simplify the processes, information which can be derived from the information in the address mapping table may be used to perform various processes.

In the address mapping table, logical address information, which is a unit of data management in the storage device 100, is associated with physical address information of the storage medium 121 in which logical address data is stored. FIG. 7 is a diagram illustrating an example of the structure of the address mapping table. For example, when the size of the logical address data is less than that of the page of the storage medium 121, logical address information arranged in ascending order is used as an index of the table, as illustrated in FIG. 7. A set of a block number, a page number, and a page offset (offset on a page), which is the physical address information of the storage medium 121, is stored as an element of the table. The size of the logical address data is set to, for example, 1024 bytes, but is not limited thereto.

The page offset is designated when the size of the logical address data is less than that of the page of the storage medium 121. For example, when the size of the logical address data is half the size of the page of the storage medium 121, "0" or "1" is designated as the page offset, which indicates that data is stored in the first half or the second half of the page. A method of designating the page offset is not limited to binary values. For example, when the size of the logical address data is one nth (n is an integer equal to or greater than 2) of the size of the page, the page offset may be designated by an n-value.

The structure of the address mapping table is not limited to that illustrated in FIG. 7. For example, when the size of the logical address data is equal to that of the page of the storage medium 121, the page offset is not needed. For example, when a plurality of storage media 121 are provided and parallel access to the storage media 121 is performed to improve the processing speed, various kinds of information may be managed in the unit of a logical block including block groups selected from each storage medium 121. In addition, various kinds of information may be managed in the unit of a logical page, which is a group of the pages with the same page number in the block 201 forming the logical block. In this case, the management information may further include a logical-physical conversion table (not illustrated) for deriving information about the block 201 forming the logical block from logical block information. In this case, the physical address information of the storage medium 121 may include a logical block number, a logical page number, and an offset on a logical page. As such, the structure of the address mapping table may be changed in various ways. Next, a structure in which the physical address information of the storage medium 121 includes a block number, a page number, and a page offset will be described. The physical address information may be appropriately changed depending on various structures of the address mapping table.

The first access control unit 151 receives an instruction to read data from the first memory 141 from a requester, reads data corresponding to the read instruction from the first memory 141, and returns the data to the requester. In addition, the first access control unit 151 receives an instruction to write data to the first memory 141 from a requester and writes data corresponding to the write instruction to the first memory 141.

The second memory 142 stores transfer position information. The transfer position information is information in which the position information of data as being a transfer source and the position information of a transfer destination are associated with each other. FIG. 8 is a diagram illustrating an example of the transfer position information. FIG. 8 illustrates an example of the transfer position information which is referred to by a writing process for each memory cell group 202 in a transfer destination block 201 after the transfer destination block 201 is determined.

A memory cell group number indicates the memory cell group number of the memory cell group 202, which is a transfer destination. A target page indicates a page to which data will be written in each writing stage of the memory cell group 202. Transfer source address information is information specifying data (transfer source data) to be transferred to the target page. Transfer source address information includes logical address information, a block number, a page number, and a page offset.

For example, when the size of the logical address data is half the size of the page of the storage medium 121 and the target page of each writing stage is as illustrated in FIG. 5, two pieces of logical address data are associated as transfer source data to be written to each target page in each writing stage of the memory cell group 202, which is a transfer destination, as illustrated in FIG. 8.

The associated pieces of information are the logical address information of the transfer source data and physical address information (the block number, the page number, and the page offset). For example, in FIG. 8, of two associated pieces of logical address data, a first piece of logical address data is transferred to the position of target page offset 0 and a second piece of logical address data is transferred to the position of target page offset 1. The association between the offsets is not limited thereto. In addition, the number of pieces of information overlapping each other may be set to one, thereby reducing the size of the transfer position information. In the following description, the size of the logical address data is half the size of the page of the storage medium 121. However, the structure of the transfer position information may be changed in various ways.

The information stored in the second memory 142 may further include information which can be derived from the transfer position information in order to simplify the various subsequent processes. In the various subsequent processes, various kinds of processing may be performed using information which can be derived from the transfer position information in order to simplify the processes.

The second access control unit 152 receives an instruction to read data from the second memory 142 from a requester, reads data corresponding to the read instruction from the second memory 142, and returns the data to the requester. In addition, the second access control unit 152 receives an instruction to write data to the second memory 142 from a requester and writes data corresponding to the write instruction to the second memory 142.

The third memory 143 is a memory (external storage device) which functions as a transfer data buffer and temporarily stores data (transfer source data) to be transferred.

The third access control unit 153 receives an instruction to read data from the third memory 143 from a requester, reads data corresponding to the read instruction from the third memory 143, and returns the data to the requester. In addition, the third access control unit 153 receives an instruction to write data to the third memory 143 from a requester and writes data corresponding to the write instruction to the third memory 143.

The host interface unit 160 receives various instructions including a write instruction (write request) and a read instruction (read request) from a host apparatus (not illustrated). The write instruction includes storage device address information and write data. The read instruction includes storage device address information. The storage device address information is information which is provided from the storage device 100 to the host apparatus. For example, a logical block address (LBA) may be used as the storage device address information of a hard disk drive (HDD) or an SSD. The size of storage device address data is set to, for example, 512 bytes, but is not limited thereto.

When the write instruction is received, the host interface unit 160 transmits the write instruction to the write control unit 112. When the read instruction is received, the host interface unit 160 transmits the read instruction to the read control unit 111.

When receiving data from the read control unit 111, the host interface unit 160 transmits the received data to the host apparatus.

When receiving the write instruction from the host interface unit 160, the write control unit 112 extracts the storage device address information and the write data from the received write instruction. The write control unit 112 instructs the medium access control unit 131 to write the extracted write data to a predetermined physical address of the storage medium 121. The write control unit 112 may determine the physical address to which the write data will be written using any method.

The block 201 which includes the storage area indicated by the physical address information, that is, the block 201 which is used as a write destination from the host apparatus and the block 201 which is used as a transfer destination, which will be described below, may be the same block 201 or different blocks 201. When the blocks 201 are the same block, the write control unit 112 cooperates with the transfer control unit 113 such that the determined physical address does not overlap the physical address of the transfer destination.

The write control unit 112 converts the extracted storage device address information into corresponding logical address information. The write control unit 112 converts the storage device address information into logical address information according to a predetermined correspondence between the storage device address information and the logical address information. For example, when the storage device address information is allocated for every 512 bytes and the logical address information is allocated for every 1024 bytes, the write control unit 112 may calculate the quotient of the storage device address information divided by 2, thereby converting the storage device address information into the logical address information.

The write control unit 112 instructs the first access control unit 151 to perform a writing process such that the physical address information of the storage medium 121 indicated by the converted logical address information is updated to the physical address information of the storage medium 121, which is a write destination, in the address mapping table.

When receiving the read instruction from the host interface unit 160, the read control unit 111 extracts the storage device address information from the received read instruction. The read control unit 111 converts the extracted storage device address information into corresponding logical address information.

The read control unit 111 instructs the first access control unit 151 to read the physical address information of the storage medium 121 indicated by the converted logical address information in the address mapping table and acquires the physical address information of the storage medium 121.

The read control unit 111 instructs the medium access control unit 131 to read data recorded at the acquired physical address of the storage medium 121 and acquires the data. The read control unit 111 transmits the acquired data to the host interface unit 160.

The transfer control unit 113, the determining unit 114, the reading unit 116, the writing unit 117, and the update unit 115 cooperate with each other to perform the following processes: a process of determining data to be transferred to the page which is required in the writing process for the first memory cell group included in the memory cell group before the writing stage (in which the page required in the writing process for the first memory cell group becomes necessary for the first time when the writing stages are performed in a predetermined order) starts; a process of reading the determined data from the semiconductor storage device and storing the read data in the external storage device before the writing stage starts; a process of performing the writing process in the writing stage of the first memory cell group using the data stored in the external storage device as data for the page required in the writing process in the writing stage of the first memory cell group when the writing stage is performed; a process of deallocating a storage area of the external storage device storing the data which is written by the writing unit 117 as the data for the page required in the writing process in the writing stage of the first memory cell group after the writing process in the writing stage is completed; and a process of updating the physical address of management information associated with the logical address of the determined data to a physical address indicating the writing position of the data in the page associated with the first memory cell group after the writing process in the last (P-th) writing stage of the first memory cell group is completed. In addition, if necessary, the storage area of the external storage device storing the data which is written as the data for the page required in the writing process in the writing stage of the first memory cell group is deallocated before a process of reading data for the page (which is required in the writing process in a writing stage subsequent to the writing stage) starts after the writing process in the writing stage is completed. Furthermore, if necessary, when the storage area of the external storage device storing the determined data is not deallocated, the determined data is not read from the semiconductor storage device. If necessary, after the writing of data in the last (P-th) writing stage of a plurality of first memory cell groups is completed, the physical address of the data written in the pages associated with the plurality of first memory cell groups is updated. In addition, if necessary, a process, such as an access process to the semiconductor storage device, and a process of updating the physical address are performed while being appropriately switched. The above will be described in detail below.

When data transfer is needed, the transfer control unit 113 controls a transfer process. As described above, there are one or more target pages, which are write targets, in each writing stage. The transfer control unit 113 instructs the determining unit 114 to determine data to be transferred to the target page before a writing stage (in which a given page becomes the target page for the first time when each writing stage is performed in a predetermined order) starts.

For example, a case in which, when the target page in each writing stage is as illustrated in FIG. 5, the writing stages of each memory cell group 202 are performed in a predetermined order illustrated in FIG. 6 will be described. In this case, the target pages of the first stage of the memory cell group 202 with memory cell group number 0, which is first in the order of writing, are the first page of the memory cell group 202 with memory cell group number 0 and the first page of the memory cell group 202 with memory cell group number 1. Both the first page of the memory cell group 202 with memory cell group number 0 and the first page of the memory cell group 202 with memory cell group number 1 become the target pages for the first time when the writing stages of each memory cell group 202 are performed in a predetermined order in the block 201, which is a transfer destination.

The target pages of the first stage of the memory cell group 202 with memory cell group number 1, which is second in the order of writing, are the first page of the memory cell group 202 with memory cell group number 1 and the first page of the memory cell group 202 with memory cell group number 2. Of them, the first page of the memory cell group 202 with memory cell group number 2 becomes the target page for the first time when the writing stages of each memory cell group 202 are performed in a predetermined order in the block 201, which is a transfer destination.

Therefore, the transfer control unit 113 instructs the determining unit 114 to determine data to be transferred to the first page of the memory cell group 202 with memory cell group number 0 and the first page of the memory cell group 202 with memory cell group number 1 before the first stage of the memory cell group 202 with memory cell group number 0, which is first in the order of writing. In addition, the transfer control unit 113 instructs the determining unit 114 to determine data to be transferred to the first page of the memory cell group 202 with memory cell group number 2 before the first stage of the memory cell group 202 with memory cell group number 1, which is second in the order of writing.

The data (transfer data) to be transferred to the first page of the memory cell group 202 with memory cell group number 1 is required in the first stage of the memory cell group 202 with memory cell group number 1, which is second in the order of writing. The transfer data is determined before the first stage of the memory cell group 202 with memory cell group number 0, which is first in the order of writing.

Unlike the example illustrated in FIG. 5, the transfer control unit 113 instructs the determining unit 114 to determine data to be transferred to the page associated with a given memory cell group 202, which is a transfer destination, before the first writing stage of a given memory cell group 202, which is a transfer destination, when the target pages of the writing processes corresponding to the number of writing stages for a given memory cell group 202 do not include the page corresponding to a memory cell group 202 different from the memory cell group 202, which is a write target, and all of the pages, which are write targets in the second and subsequent writing stages of a given memory cell group 202, are included in the pages, which are write targets in the first writing stage of the memory cell group 202.

After the data (transfer data) required in a given writing stage of the memory cell group 202, which is a transfer destination, is determined, the transfer control unit 113 instructs the reading unit 116 to read the transfer data before the writing stage of the memory cell group 202, which is the transfer destination. The process of reading the transfer data may be performed after the determining unit 114 determines all transfer data for each of one or more target pages, or it may be appropriately performed as soon as the determining unit 114 determines at least a portion of the transfer data.

When the buffer area of the third memory 143 storing the transfer data has not been deallocated, the reading process may be omitted and the transfer data which has been read to the buffer area may be used in the subsequent process.

In a given writing stage of a given memory cell group 202, which is a transfer destination, the transfer control unit 113 instructs the writing unit 117 to perform the writing stage of the memory cell group 202.

In a case in which the writing stages of each memory cell group 202 in the block 201, which is a transfer destination, are performed in a predetermined order, after a writing process is completed in a given writing stage of a given memory cell group 202, which is a transfer destination, the transfer control unit 113 deallocates the buffer area of the third memory 143 storing the transfer data. The buffer area may be deallocated immediately after the writing stage is completed. That is, after a given writing stage is completed, the buffer area used in the writing stage may be deallocated before the next writing stage starts. In this case, it is possible to reduce the memory usage of the third memory 143. In addition, the deallocation of the buffer area may be delayed. When the data stored in the buffer area is required in the subsequent writing stage, the buffer area may not be deallocated until the writing stage. In this way, it is possible to reduce the costs of a reading process.

After a writing process is completed in the last writing stage among the writing stages which are performed in a predetermined order for the memory cell group 202, which is a transfer destination, the transfer control unit 113 instructs the update unit 115 to update management information about one or more pages corresponding to the memory cell group 202. For example, in the case of the memory cell group 202 with memory cell group number 0 illustrated in FIG. 4, the transfer control unit 113 instructs the update unit 115 to update management information about four pages, that is, the first page, the second page, the third page, and the fourth page with page number 0, page number 1, page number 2, and page number 3 which correspond to the memory cell group 202 with memory cell group number 0.

Transfer position information is required to update the management information, which will be described. The transfer control unit 113 may instruct the update unit 115 to update the management information so that the management information is updated in a predetermined unit. For example, among pieces of information included in the transfer position information, a piece of information required for the management information update process may be separately stored. For example, when the predetermined unit is the block 201, the transfer control unit 113 may instruct the update unit 115 to update the management information about the block 201 at the time when the writing of all data to the block 201, which is a transfer destination, is completed. The update unit 115 may continuously perform only the management information update process. In this case, it is possible to simply control the update process. When the update process is continuously performed, for example, access to the storage medium 121 is likely to be limited. Therefore, the update unit 115 may perform the update process after the process is appropriately switched to another process, such as an access process to the storage medium 121.

The transfer control unit 113 repeatedly performs the above-mentioned process group according to the predetermined order of the writing stages of each memory cell group 202 in the block 201, if necessary.

The determining unit 114 determines data to be transferred to the page (target page), which is the transfer destination designated by the transfer control unit 113. Specifically, the determining unit 114 instructs the first access control unit 151 to read the management information from the first memory 141 and acquires the management information. The determining unit 114 extracts pieces of logical address information and physical address information of the data to be transferred from the acquired management information, on the basis of a predetermined method. The determining unit 114 may use any method to extract the data to be transferred.

The determining unit 114 extracts the pieces of logical address information and physical address information corresponding to the number of pieces of logical address data with the same size as that of the transfer destination page designated by the transfer control unit 113 from the extracted pieces of logical address information and physical address information. For example, when the size of the logical address data is half the size of the page of the storage medium 121, two pieces of logical address information and two pieces of physical address information are extracted.

When the block 201 used as the transfer destination is identical to the block 201 which is used by the write control unit 112 as the write destination of the data requested to be written by the host apparatus, the logical address data corresponding to the data which is requested to be written by the host apparatus may be included in a portion of the logical address data with the same size as that of the transfer destination page.

The determining unit 114 instructs the second access control unit 152 to perform a writing process such that logical address information and physical address information corresponding to the size of the target page are registered as information corresponding to the page (target page) of the transfer destination designated by the transfer control unit 113 in the transfer position information.

The reading unit 116 reads one or more pieces of transfer data required in a given writing stage of the memory cell group 202 designated by the transfer control unit 113. As described above, when the size of the logical address data is less than that of the page of the storage medium 121, a plurality of pieces of transfer data are associated with one page. Therefore, the reading unit 116 instructs the second access control unit 152 to read one or more pieces of physical address information corresponding to one or more target pages of a given writing stage of the memory cell group 202 designated by the transfer control unit 113. Then, the reading unit 116 acquires one or more pieces of physical address information corresponding to the target pages.

Then, the reading unit 116 performs the following process on each of the acquired one or more pieces of physical address information. In the subsequent process, any method may be used to exchange pieces of information or data. For example, a plurality of pieces of information or data may be exchanged at a time or they may be exchanged one by one.

The reading unit 116 instructs the medium access control unit 131 to read data stored at the position indicated by the acquired physical address information of the storage medium 121 and acquires the data stored at the position indicated by the acquired physical address information. When the size of the logical address data is less than that of the page, a process of extracting necessary data from the page data which is read from the storage medium 121 is performed since data is input and output to and from the storage medium 121 in page units.

The reading unit 116 instructs the third access control unit 153 to perform a writing process such that the acquired data is temporarily stored in the third memory 143.

The writing unit 117 performs a writing process in each writing stage of the memory cell group 202 designated by the transfer control unit 113. Specifically, the writing unit 117 instructs the second access control unit 152 to read one or more pieces of transfer source address information required in the current writing stage and acquires one or more pieces of transfer source address information.

The writing unit 117 instructs the third access control unit 153 to read one or more pieces of data specified by the acquired one or more pieces of transfer source address information from the third memory 143 and acquires one or more pieces of data.

The writing unit 117 instructs the medium access control unit 131 to perform a writing process in the writing stage, using the acquired one or more pieces of data as data to be written to the target pages in the current writing stage.

In the above-mentioned process group, any method may be used to exchange a plurality of pieces of information or data. For example, a plurality of pieces of information or data may be exchanged at a time or they may be exchanged one by one.

The update unit 115 instructs the update of the management information about one or more pages corresponding to the designated memory cell group 202 designated by the transfer control unit 113. As described in the storage medium 121, one or more pages are associated with the memory cell group 202. For example, in the case of the memory cell group 202 with memory cell group number 0 illustrated in FIG. 4, four pages, that is, the first page, the second page, the third page, and the fourth page with page number 0, page number 1, page number 2, and page number 3 are associated with the memory cell group 202 with memory cell group number 0. As described above, when the size of the logical address data is less than that of the page of the storage medium 121, a plurality of pieces of data to be transferred are associated with one page.

The update unit 115 instructs the second access control unit 152 to read the logical address information and physical address information of one or more pieces of data which have been transferred to one or more pages corresponding to the memory cell group 202 designated by the transfer control unit 113 and acquires one or more pieces of logical address information and physical address information.

In addition, the update unit 115 calculates the page offset to which one or more pieces of data transferred to the acquired page is transferred. In this way, the update unit 115 acquires logical address information, the physical address information of the transfer source, and the physical address information of the transfer destination for the transferred one or more pieces of data. Then, the update unit 115 performs the following process on each piece of the acquired logical address information, the acquired physical address information of the transfer source, and the acquired physical address information of the transfer destination. In the subsequent process, any method may be used to exchange a plurality of pieces of information or data. For example, a plurality of pieces of information or data may be exchanged at a time or they may be exchanged one by one.

The update unit 115 instructs the first access control unit 151 to perform a writing process such that the physical address information of the storage medium 121 indicated by the acquired logical address information is updated to the physical address information of the storage medium 121, which is a transfer destination, in the address mapping table. Here, the physical address information of the storage medium 121 includes a block number, a page number, and a page offset. Therefore, the physical address information of the storage medium 121, which is a transfer destination, includes the block number of the memory cell group 202 designated by the transfer control unit 113, the page number to which data with the logical address is transferred, and a page offset to which the data with the logical address is transferred. The physical address information may be appropriately changed depending on various structures of the address mapping table.

Next, the operation of the storage device according to the first embodiment will be described.

First, the procedure of the writing process performed by the storage device 100 in response to a write instruction from the host apparatus will be described with reference to FIG. 9. FIG. 9 is a flowchart illustrating an example of the flow of the writing process of the storage device 100 according to the first embodiment.

The host interface unit 160 receives a write instruction from the host apparatus (Step S11). The host interface unit 160 transmits the write instruction to the write control unit 112. When receiving the write instruction from the host interface unit 160, the write control unit 112 extracts storage device address information and write data from the received write instruction.

The write control unit 112 writes data which is requested to be written to the storage medium 121 (Step S12). Specifically, the write control unit 112 instructs the medium access control unit 131 to write the extracted write data to a predetermined physical address of the storage medium 121. The medium access control unit 131 writes the write data to a predetermined physical address of the storage medium 121 corresponding to the write request.

The block 201 which is a write destination of the write data and includes the storage area indicated by predetermined physical address information, that is, the block 201 which is used as a write destination by the host apparatus, and the block 201 which is used as a transfer destination, which will be described below, may be the same block 201 or different blocks 201.

The write control unit 112 updates the management information (Step S13). Specifically, the write control unit 112 converts the extracted storage device address information into the corresponding logical address information. The write control unit 112 instructs the first access control unit 151 to perform a writing process such that the physical address information of the storage medium 121 indicated by the converted logical address information is updated to the physical address information of the storage medium 121, which is a write destination, in the address mapping table. The first access control unit 151 updates (writing process) the physical address information of the storage medium 121 indicated by the converted logical address information to the physical address information of the storage medium 121, which is a write destination.

Next, the procedure of the reading process performed by the storage device 100 in response to a read instruction from the host apparatus will be described with reference to FIG. 10. FIG. 10 is a flowchart illustrating an example of the flow of the reading process of the storage device 100.

The host interface unit 160 receives a read instruction from the host apparatus (Step S21). The host interface unit 160 transmits the read instruction to the read control unit 111. When receiving the read instruction from the host interface unit 160, the read control unit 111 extracts storage device address information from the received read instruction.

The read control unit 111 reads data which is requested to be read (Step S22). Specifically, the read control unit 111 converts the extracted storage device address information into the corresponding logical address information. The read control unit 111 instructs the first access control unit 151 to read the physical address information of the storage medium 121 indicated by the converted logical address information in the address mapping table. The first access control unit 151 reads the physical address information of the storage medium 121 indicated by the converted logical address information in the address mapping table and returns the physical address information to the read control unit 111. The read control unit 111 acquires the physical address information of the storage medium 121.

The read control unit 111 instructs the medium access control unit 131 to read data recorded at the acquired physical address of the storage medium 121. The medium access control unit 131 reads the data recorded at the acquired physical address of the storage medium 121 and returns the data to the read control unit 111. The read control unit 111 acquires the data from the medium access control unit 131.

The read control unit 111 returns the read data (Step S23). Specifically, the read control unit 111 transmits the acquired data to the host interface unit 160. When receiving data from the read control unit 111, the host interface unit 160 transmits the received data to the host apparatus.

Figure 11:
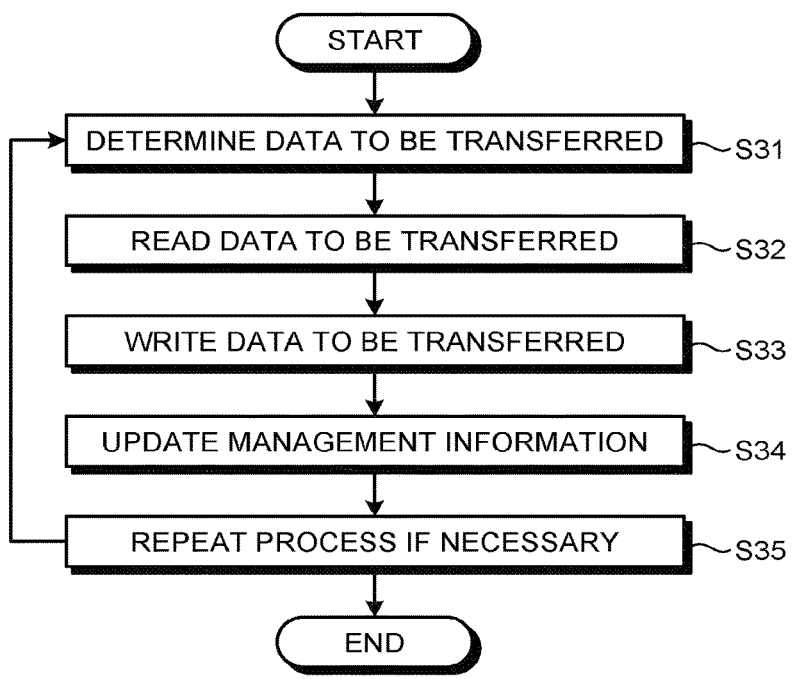
FIG. 11 is a flowchart illustrating a transfer process according to the first embodiment.

Next, the procedure of the transfer process of the storage device 100 will be described with reference to FIG. 11. FIG. 11 is a flowchart illustrating an example of the flow of the transfer process of the storage device 100. When data transfer is needed, the transfer control unit 113 controls the transfer process illustrated in FIG. 11. For example, the same method as that in a conventional transfer process such as a compaction process or a garbage collection process may be used to determine whether data transfer is needed.

First, data to be transferred is determined (Step S31). As described above, there are one or more target pages to be written to a given memory cell group 202 in a given writing stage. When the writing stages of each memory cell group 202 in the block 201, which is a transfer destination, are performed in a predetermined order, the transfer control unit 113 instructs the determining unit 114 to determine data to be transferred to the target page before a writing stage in which a given page becomes the target page for the first time.

The determining unit 114 determines data to be transferred to the transfer destination page designated by the transfer control unit 113. Specifically, the determining unit 114 instructs the first access control unit 151 to read management information from the first memory 141. The first access control unit 151 reads the management information which is designated to be read from the first memory 141 and returns the management information to the requester. The determining unit 114 acquires the management information. The determining unit 114 extracts a plurality of pieces of logical address information and physical address information of the data to be transferred from the acquired management information, on the basis of a predetermined method. Any method may be used to extract the data to be transferred.

The determining unit 114 extracts logical address information and physical address information corresponding to the number of pieces of logical address data with the same size as that of the transfer destination page designated by the transfer control unit 113 from the extracted plurality of pieces of logical address information and physical address information. For example, when the size of the logical address data is half the size of the page of the storage medium 121, two pieces of logical address information and two pieces of physical address information are extracted.

When the block 201 used as the transfer destination is identical to the block 201 which is used by the write control unit 112 as the write destination of the data requested to be written by the host apparatus, the logical address data corresponding to the data which is requested to be written by the host apparatus may be included in a portion of the logical address data with the same size as that of the transfer destination page.

The determining unit 114 instructs the second access control unit 152 to perform a writing process such that logical address information and physical address information corresponding to the size of the target page are registered as information corresponding to the transfer destination page (target page) designated by the transfer control unit 113 in the transfer position information. The second access control unit 152 registers (writes) the designated information in the transfer position information of the second memory 142.

For example, a case in which, when the target page in each writing stage is as illustrated in FIG. 5, the writing stages of each memory cell group 202 are performed in a predetermined order illustrated in FIG. 6 will be described. In this case, the target pages of the first stage of the memory cell group 202 with memory cell group number 0, which is first in the order of writing, are the first page of the memory cell group 202 with memory cell group number 0 and the first page of the memory cell group 202 with memory cell group number 1. Both the first page of the memory cell group 202 with memory cell group number 0 and the first page of the memory cell group 202 with memory cell group number 1 become the target pages for the first time when the writing stages of each memory cell group 202 are performed in a predetermined order in the block 201, which is a transfer destination.

The target pages of the first stage of the memory cell group 202 with memory cell group number 1, which is second in the order of writing, are the first page of the memory cell group 202 with memory cell group number 1 and the first page of the memory cell group 202 with memory cell group number 2. Of them, the first page of the memory cell group 202 with memory cell group number 2 becomes the target page for the first time when the writing stages of each memory cell group 202 are performed in a predetermined order in the block 201, which is a transfer destination.

Therefore, the transfer control unit 113 instructs the determining unit 114 to determine data to be transferred to the first page of the memory cell group 202 with memory cell group number 0 and the first page of the memory cell group 202 with memory cell group number 1 before the first stage of the memory cell group 202 with memory cell group number 0, which is first in the order of writing. In addition, the transfer control unit 113 instructs the determining unit 114 to determine data to be transferred to the first page of the memory cell group 202 with memory cell group number 2 before the first stage of the memory cell group 202 with memory cell group number 1, which is second in the order of writing.

The data (transfer data) to be transferred to the first page of the memory cell group 202 with memory cell group number 1 is required in the first stage of the memory cell group 202 with memory cell group number 1, which is second in the order of writing. The transfer data is determined before the first stage of the memory cell group 202 with memory cell group number 0, which is first in the order of writing.

Unlike the example illustrated in FIG. 5, the transfer control unit 113 instructs the determining unit 114 to determine data to be transferred to the page associated with a given memory cell group 202, which is a transfer destination, before the first writing stage of a given memory cell group 202, which is a transfer destination, when the target pages of the writing processes corresponding to a given number of writing stages for a given memory cell group 202 do not include the page corresponding to a memory cell group 202 different from the memory cell group 202, which is a write target, and all of the pages, which are write targets in the second and subsequent writing stages of a given memory cell group 202, are included in the pages, which are write targets in the first writing stage of the memory cell group 202.

Then, the data to be transferred is read (Step S32). Specifically, after the data (transfer data) required for a given writing stage of the memory cell group 202, which is a transfer destination, is determined, the transfer control unit 113 instructs the reading unit 116 to read the transfer data before the writing stage of the memory cell group 202, which is the transfer destination. The process of reading the transfer data may be performed after the determining unit 114 determines all transfer data for each of one or more target pages, or it may be appropriately performed as soon as the determining unit 114 determines at least a portion of the transfer data.

The reading unit 116 reads one or more pieces of transfer data required in a given writing stage of the memory cell group 202 designated by the transfer control unit 113. As described above, when the size of the logical address data is less than that of the page of the storage medium 121, a plurality of pieces of transfer data are associated with one page. Therefore, the reading unit 116 instructs the second access control unit 152 to read one or more pieces of physical address information corresponding to one or more target pages of a given writing stage of the memory cell group 202 designated by the transfer control unit 113.

The second access control unit 152 reads the designated information from the second memory 142 with the transfer position information and returns the read information to the requester. The reading unit 116 acquires one or more pieces of physical address information corresponding to each target page. Then, the reading unit 116 performs the following process on each of the acquired one or more pieces of physical address information. In the subsequent process, any method may be used to exchange a plurality of pieces of information or data. For example, a plurality of pieces of information or data may be exchanged at a time or they may be exchanged one by one.

The reading unit 116 instructs the medium access control unit 131 to read data which is stored at the position indicated by the acquired physical address information of the storage medium 121. The medium access control unit 131 reads the data which is instructed to be read from the storage medium 121 and returns the data to the requester. The reading unit 116 acquires the data which is stored at the position indicated by the acquired physical address information. When the size of the logical address data is less than that of the page, a process of extracting necessary data from the page data which is read from the storage medium 121 is performed since data is input and output to and from the storage medium 121 in page units.

The reading unit 116 instructs the third access control unit 153 to perform a writing process such that the acquired data is temporarily stored in the third memory 143. The third access control unit 153 writes the designated data to the third memory 143.

When the buffer area of the third memory 143 storing the transfer data has not been deallocated, the reading process may be omitted and the transfer data which has been read to the buffer area may be used in the subsequent process.

Then, the data to be transferred is written to the storage medium 121 (Step S33). Specifically, in a given writing stage of a given memory cell group 202, which is a transfer destination, the transfer control unit 113 instructs the writing unit 117 to perform the writing stage of the memory cell group 202.

The writing unit 117 performs the writing process in each writing stage of the memory cell group 202 designated by the transfer control unit 113. Specifically, the writing unit 117 instructs the second access control unit 152 to read one or more pieces of transfer source address information required in the current writing stage. The second access control unit 152 reads information which is instructed to be read from the second memory 142 storing the transfer position information and returns the read information to the requester. The writing unit 117 acquires one or more pieces of transfer source address information.

The writing unit 117 instructs the third access control unit 153 to read one or more pieces of data specified by the acquired one or more pieces of transfer source address information from the third memory 143. The third access control unit 153 reads the data which is instructed to be read from the third memory 143 and returns the read data to the requester. The writing unit 117 acquires one or more pieces of data.

The writing unit 117 instructs the medium access control unit 131 to perform a writing process in the writing stage, using the acquired one or more pieces of data as data to be written to the target pages in the current writing stage.

The medium access control unit 131 performs the writing process in the current writing stage, using the data which is instructed to be written as the data to be written to the target pages in the current writing stage.

In the above-mentioned process group, any method may be used to exchange a plurality of pieces of information or data. For example, a plurality of pieces of information or data may be exchanged at a time or they may be exchanged one by one.

In a case in which the writing stages of each memory cell group 202 in the block 201, which is a transfer destination, are performed in a predetermined order, after a writing process is completed in a given writing stage of a given memory cell group 202, which is a transfer destination, the transfer control unit 113 deallocates the buffer area of the third memory 143 storing the transfer data. The buffer area may be deallocated immediately after the writing stage is completed. In this case, it is possible to reduce the memory usage of the third memory 143. In addition, the deallocation of the buffer area may be delayed. When the data stored in the buffer area is required in the subsequent writing stage, the buffer area may not be deallocated until the writing stage. In this way, it is possible reduce the costs of a reading process.

Then, the management information is updated (Step S34). Specifically, after a writing process is completed in the last writing stage among the writing stages which are performed in a predetermined order for the memory cell group 202, which is a transfer destination, the transfer control unit 113 instructs the update unit 115 to update management information about one or more pages corresponding to the memory cell group 202. For example, in the case of the memory cell group 202 with memory cell group number 0 illustrated in FIG. 4, the transfer control unit 113 instructs the update unit 115 to update management information about four pages, that is, the first page, the second page, the third page, and the fourth page with page number 0, page number 1, page number 2, and page number 3 which correspond to the memory cell group 202 with memory cell group number 0.

The transfer position information is required to update the management information, which will be described. The transfer control unit 113 may instruct the update unit 115 to update the management information so that the management information is updated in a predetermined unit. For example, among pieces of information included in the transfer position information, a piece of information required for the management information update process may be separately stored. For example, when the predetermined unit is the block 201, the transfer control unit 113 may instruct the update unit to update the management information about the block 201 at the time when the writing of all data to the block 201, which is a transfer destination, is completed. The update unit 115 may continuously perform only the management information update process. The update unit 115 may perform the update process while appropriately switching the process to another process, such as an access process to the storage medium 121.

The update unit 115 instructs the update of the management information about one or more pages corresponding to the designated memory cell group 202 designated by the transfer control unit 113. As described in the storage medium 121, one or more pages are associated with the memory cell group 202. For example, in the case of the memory cell group 202 with memory cell group number 0 illustrated in FIG. 4, four pages, that is, the first page, the second page, the third page, and the fourth page with page number 0, page number 1, page number 2, and page number 3 are associated with the memory cell group 202 with memory cell group number 0. As described above, when the size of the logical address data is less than that of the page of the storage medium 121, a plurality of pieces of data to be transferred are associated with one page.

The update unit 115 instructs the second access control unit 152 to read the logical address information and physical address information of one or more pieces of data which have been transferred to one or more pages corresponding to the memory cell group 202 designated by the transfer control unit 113.

The second access control unit 152 reads the information which is instructed to be read from the second memory 142 with the transfer position information and returns the read information to the requester. The update unit 115 acquires one or more pieces of logical address information and physical address information. In addition, the update unit 115 calculates the page offset to which one or more pieces of data transferred to the acquired page is transferred. In this way, the update unit 115 acquires logical address information, the physical address information of the transfer source, and the physical address information of the transfer destination for the transferred one or more pieces of data. Then, the update unit 115 performs the following process on each of the acquired piece of logical address information, the acquired physical address information of the transfer source, and the acquired physical address information of the transfer destination. In the subsequent process, any method may be used to exchange a plurality of pieces of information or data. For example, a plurality of pieces of information or data may be exchanged at a time or they may be exchanged one by one.

The update unit 115 instructs the first access control unit 151 to perform a writing process such that the physical address information of the storage medium 121 indicated by the acquired logical address information is updated to the physical address information of the storage medium 121, which is a transfer destination, in the address mapping table. The first access control unit 151 updates (writes) the information registered in the address mapping table of the first memory 141 to the designated information.

In this embodiment, the physical address information of the storage medium 121 includes a block number, a page number, and a page offset. Therefore, the physical address information of the storage medium 121, which is a transfer destination, the block number of the memory cell group 202 designated by the transfer control unit 113, the page number to which data with the logical address is transferred, and a page offset to which the data with the logical address is transferred. The physical address information may be appropriately changed depending on various structures of the address mapping table.

Then, if necessary, a process from Step S31 to Step S34 is repeatedly performed (Step S35). Specifically, the transfer control unit 113 repeatedly performs a process group from Step S31 to Step S34 in a predetermined order of the writing stages of each memory cell group 202 in the block 201, if necessary. When there is no necessity to repeatedly perform the process, the process ends.

As such, in the storage device according to the first embodiment, even when, for example, the writing order of a plurality of writing stages and memory cell groups is defined, it is possible to prepare for necessary data at an appropriate timing and perform a transfer process for a semiconductor storage medium in an appropriate order.

However, with the miniaturization of the semiconductor storage medium, the writing of data to a given memory cell group affects data recorded in an adjacent memory cell group. The NAND flash memory disclosed in the following reference document uses the following writing sequence to remove the influence: "A 5.6 MB/s 64 Gb 4b/Cell NAND Flash memory in 43 nm CMOS", Solid-State Circuits Conference-Digest of Technical Papers, 2009. ISSCC 2009. IEEE International, 8-12 Feb. 2009, pp. 246-247, 247a.

In such a NAND flash memory, the pages required in each writing stage are associated with each other, for example, as illustrated in FIG. 12. FIG. 12 is a diagram illustrating another example of the page (target page), which is a write target, in each writing stage. For example, as illustrated in FIG. 12, the same page is required in all of the writing stages of a given memory cell group 202 and the pages which are associated with a memory cell group 202 different from the memory cell group 202, which is a write target, are not included in the pages associated with the memory cell group 202, which is a write target.

In the NAND flash memory, the writing stages of each memory cell group 202 are performed, for example, in the order illustrated in FIG. 13. FIG. 13 is a diagram illustrating another example of the writing order. In FIG. 13, for example, after a writing process is performed in the first stage of the memory cell group 202 with memory cell group number 0, the writing process needs to be sequentially performed in the first stage of the memory cell group 202 with memory cell group number 1 and the second stage of the memory cell group 202 with memory cell group number 0. This writing order removes the influence of the writing of data to a given memory cell group on data recorded in an adjacent memory cell group.

When the NAND flash memory with the writing sequence is used as the storage medium 121, in this embodiment, a memory capacity corresponding to 12 pages (4 pages×3) or more may be ensured in the third memory 143 and the buffer area storing the read data may not be deallocated while the read data is needed. In this way, it is possible to perform the transfer process without reading the same data a plurality of times. However, with a reduction in the size of the semiconductor storage medium and an increase in the memory capacity thereof, the capacity of the page has increased. Therefore, it is necessary to reduce the memory capacity used in the transfer process.

In this embodiment, immediately after the writing process in each writing stage is completed, the buffer area which stores data required in each writing stage may be deallocated and data required in the writing stage of the memory cell group may be read from the storage medium 121 in each writing stage. In this way, it is possible to reduce the capacity of the third memory 143 by a value corresponding to four pages and reduce the memory capacity used in the transfer process.

The above-mentioned structure holds for the case in which a 3-bit-per-cell NAND flash memory with the same writing sequence as described above is used as the storage medium 121. FIG. 14 is a diagram illustrating an example of a page (target page) which is a write target in each writing stage in this case.

For example, the pages required in each writing stage are associated with each other as illustrated in FIG. 14. The writing stages of each memory cell group 202 are performed, for example, in the order illustrated in FIG. 13. When the NAND flash memory with the writing sequence is used as the storage medium 121, in this embodiment, a memory capacity corresponding to 9 pages (3 pages×3) or more may be ensured in the third memory 143 and the buffer area storing the read data may not be deallocated while the read data is needed. In this way, it is possible to perform the transfer process without reading the same data a plurality of times. In this embodiment, immediately after the writing process in each writing stage is completed, the buffer area which stores data required in each writing stage may be deallocated and data required in the writing stage of the memory cell group may be read from the storage medium 121 in each writing stage. In this way, it is possible to reduce the capacity of the third memory 143 by a value corresponding to three pages and reduce the memory capacity used in the transfer process.

Second Embodiment

However, there is a possibility that the process of writing data which is requested to be written by the host apparatus and the process of transferring the data will overlap each other for data with the same logical address and it is necessary to ensure the consistency of management information. In a second embodiment, an example in which the consistency of the management information is ensured in the management information update process of the transfer process.

First, the structure of a storage device according to the second embodiment will be described. In the second embodiment, components having the same functions as those in the first embodiment have the same names as those in the first embodiment and are denoted by the same reference numerals as those in the first embodiment and the description thereof will not be repeated.

Figure 15:
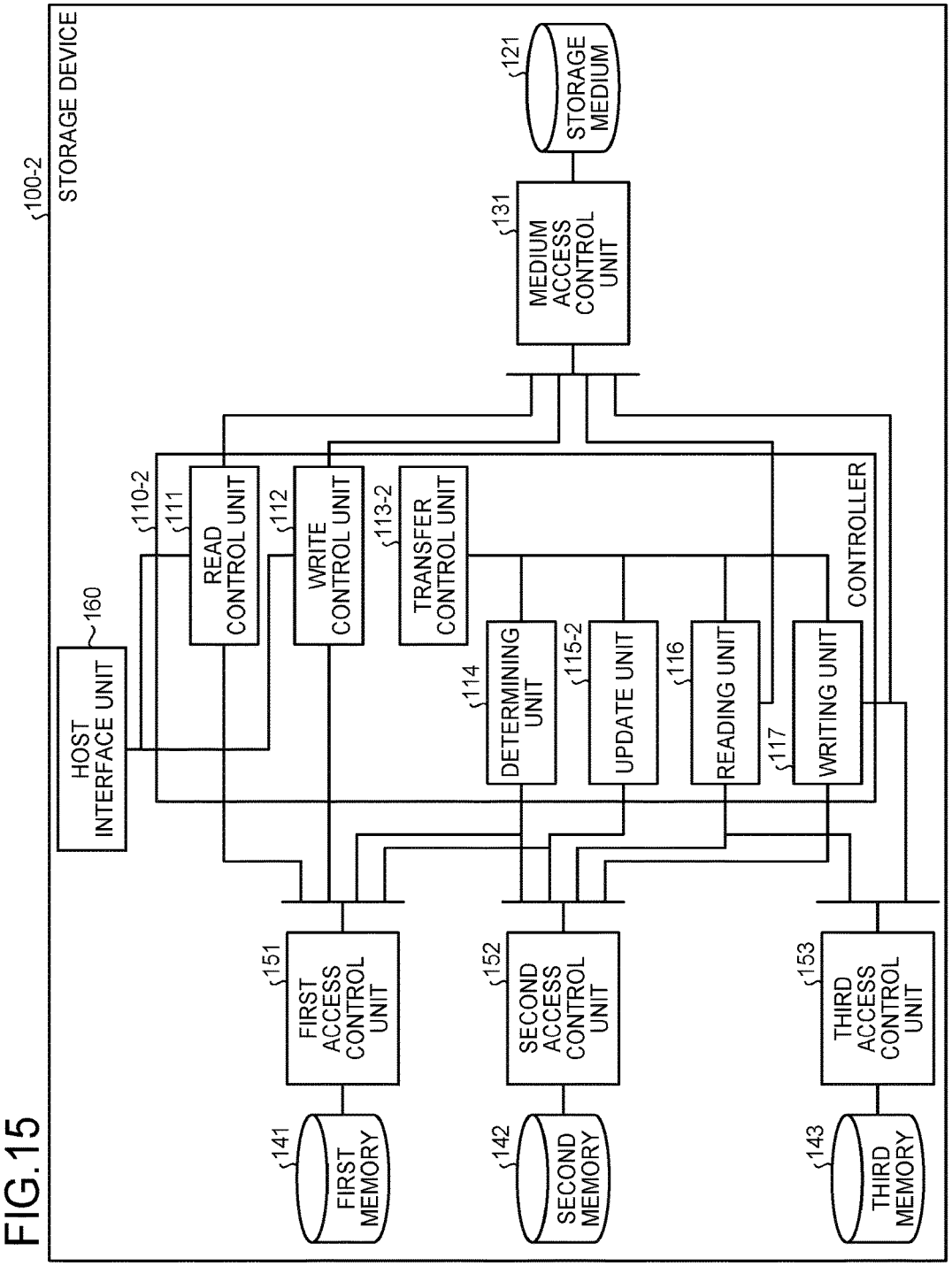
FIG. 15 is a block diagram illustrating a storage device according to a second embodiment.

FIG. 15 is a block diagram illustrating an example of the outline of the functional structure of a storage device 100-2 according to the second embodiment. As illustrated in FIG. 15, the storage device 100-2 includes a controller 110-2, the first access control unit 151, the first memory 141, the second access control unit 152, the second memory 142, the third access control unit 153, the third memory 143, the medium access control unit 131, the storage medium 121, and the host interface unit 160. The controller 110-2 includes a transfer control unit 113-2, the determining unit 114, the reading unit 116, the writing unit 117, an update unit 115-2, the write control unit 112, and the read control unit 111.

The transfer control unit 113-2 differs from the transfer control unit 113 according to the first embodiment in that it cooperates with the update unit 115-2 instead of the update unit 115 among a plurality of components and the description thereof will not be repeated.

When a physical address indicating the writing position of data in a corresponding page in a memory cell group before the data is written to the page corresponding to a first memory cell group of the memory cell group is identical to the physical address of management information corresponding to the logical address of the data, the update unit 115-2 updates the physical address of the management information corresponding to the logical address of the data to the physical address indicating the writing position of the data in the corresponding page in the first memory cell group, which will be described in detail below.

The update unit 115-2 performs the following process which is the same as a portion of the process performed by the update unit 115 according to the first embodiment.

The update unit 115-2 instructs the update of the management information about one or more pages corresponding to the memory cell group 202 which is designated by the transfer control unit 113-2.

As described in the storage medium 121, one or more pages are associated with the memory cell group 202. For example, in the case of the memory cell group 202 with memory cell group number 0 illustrated in FIG. 4, four pages, that is, the first page, the second page, the third page, and the fourth page with page number 0, page number 1, page number 2, and page number 3 are associated with the memory cell group 202 with memory cell group number 0. In addition, as described above, when the size of the logical address data is less than the size of the page of the storage medium 121, a plurality of pieces of data to be transferred correspond to one page.

The update unit 115-2 instructs the second access control unit 152 to read the logical address information and physical address information of one or more pieces of data which have been transferred to one or more pages corresponding to the memory cell group 202 designated by the transfer control unit 113-2 and acquires one or more pieces of logical address information and physical address information.

In addition, the update unit 115-2 calculates the page offset to which one or more pieces of data transferred to the acquired page is transferred. In this way, the update unit 115-2 acquires logical address information, the physical address information of the transfer source, and the physical address information of the transfer destination for the transferred one or more pieces of data. Then, the update unit 115-2 performs the following process on each piece of the acquired logical address information, the acquired physical address information of the transfer source, and the acquired physical address information of the transfer destination. In the subsequent process, any method may be used to exchange a plurality of pieces of information or data. For example, a plurality of pieces of information or data may be exchanged at a time or they may be exchanged one by one.

The update unit 115-2 instructs the first access control unit 151 to read the physical address information (hereinafter, referred to as physical address information before update) of the storage medium 121 corresponding to the acquired logical address information in the address mapping table and acquires the physical address information before update in the address mapping table. The update unit 115-2 compares the physical address information of the transfer source with the physical address information before update.

As a result of the comparison, when the pieces of physical address information are not identical to each other, the process of writing data which is requested to be written by the host apparatus to data with the same logical address and the transfer process overlap each other and a process of updating the address mapping table which is performed in the process of writing the data requested to be written by the host apparatus ends at least at the comparison time. Therefore, when the pieces of physical address information are not identical to each other as a result of the comparison, the update unit 115-2 ends the process.

On the other hand, as a result of the comparison, when the pieces of physical address information are identical to each other, the process of updating the address mapping table which is performed in the process of writing the data requested to be written by the host apparatus does not start at least at the comparison time even when the process of writing the data which is requested to be written by the host apparatus to the data with the same logical address and the transfer process overlap each other. Therefore, the update unit 115-2 performs the following process which is the same as a portion of the process performed by the update unit 115.

The update unit 115-2 instructs the first access control unit 151 to perform a writing process such that the physical address information of the storage medium 121 indicated by the acquired logical address information is updated to the physical address information of the storage medium 121, which is a transfer destination, in the address mapping table. Here, the physical address information of the storage medium 121 includes a block number, a page number, and a page offset. Therefore, the physical address information of the storage medium 121, which is a transfer destination, includes the block number of the memory cell group 202 designated by the transfer control unit 113-2, the page number to which data with the logical address is transferred, and a page offset to which the data with the logical address is transferred. The physical address information may be appropriately changed depending on various structures of the address mapping table.

As described above, the physical address information of the transfer source is compared with the physical address information before update. When the pieces of physical address information are identical to each other, the information about the address mapping table is updated. When the pieces of physical address information are not identical to each other, the information about the address mapping table is not updated. In this way, when the process of writing the data which is requested to be written by the host apparatus to the data with the same logical address and the transfer process overlap each other, it is possible to maintain the consistency of the management information.

Next, the operation of the storage device according to the second embodiment will be described. FIG. 16 is a flowchart illustrating an example of the flow of the transfer process performed by the storage device 100-2 according to the second embodiment.

When data transfer is needed, the transfer control unit 113-2 controls the transfer process illustrated in FIG. 16.

Steps S41 to S43 are the same as Steps S31 to S33 (see FIG. 11) in the storage device 100 according to the first embodiment and thus the description thereof will not be repeated.

The transfer control unit 113-2 compares the physical address information of the transfer source with the physical address information before update (Step S44). Specifically, after a writing process is completed in the last writing stage among the writing stages which are performed in a predetermined order for the memory cell group 202, which is a transfer destination, the transfer control unit 113-2 instructs the update unit 115-2 to update management information about one or more pages corresponding to the memory cell group 202. For example, in the case of the memory cell group 202 with memory cell group number 0 illustrated in FIG. 4, the transfer control unit 113-2 instructs the update unit 115-2 to update management information about four pages, that is, the first page, the second page, the third page, and the fourth page with page number 0, page number 1, page number 2, and page number 3 which correspond to the memory cell group 202 with memory cell group number 0.

Transfer position information is required to update the management information. The transfer control unit 113-2 may instruct the update unit 115-2 to update the management information so that the management information is updated in a predetermined unit. For example, among pieces of information included in the transfer position information, a piece of information required to update the management information may be separately stored. For example, when the predetermined unit is the block 201, the transfer control unit 113-2 may instruct the update unit 115-2 to update the management information about the block 201 at the time when the writing of all data to the block 201, which is a transfer destination, is completed. The update unit 115-2 may continuously perform only the management information update process. The update unit 115-2 may perform the update process while appropriately switching the process to another process, such as an access process to the storage medium 121.

The update unit 115-2 instructs the update of the management information about one or more pages corresponding to the memory cell group 202 which is designated by the transfer control unit 113-2. As described in the storage medium 121, one or more pages are associated with the memory cell group 202. For example, in the case of the memory cell group 202 with memory cell group number 0 illustrated in FIG. 4, four pages, that is, the first page, the second page, the third page, and the fourth page with page number 0, page number 1, page number 2, and page number 3 are associated with the memory cell group 202 with memory cell group number 0. As described above, when the size of the logical address data is less than that of the page of the storage medium 121, a plurality of pieces of data to be transferred are associated with one page.

The update unit 115-2 instructs the second access control unit 152 to read the logical address information and physical address information of one or more pieces of data which have been transferred to one or more pages corresponding to the memory cell group 202 designated by the transfer control unit 113-2. The second access control unit 152 reads the information which is instructed to be read from the second memory 142 with the transfer position information and returns the read information to the requester. The update unit 115-2 acquires one or more pieces of logical address information and physical address information.

In addition, the update unit 115-2 calculates the page offset to which one or more pieces of data transferred to the acquired page is transferred. In this way, the update unit 115-2 acquires logical address information, the physical address information of the transfer source, and the physical address information of the transfer destination for the transferred one or more pieces of data. Then, the update unit 115-2 performs the following process on each piece of the acquired logical address information, the acquired physical address information of the transfer source, and the acquired physical address information of the transfer destination. In the subsequent process, any method may be used to exchange a plurality of pieces of information or data. For example, a plurality of pieces of information or data may be exchanged at a time or they may be exchanged one by one.

The update unit 115-2 instructs the first access control unit 151 to read the physical address information (hereinafter, referred to as physical address information before update) of the storage medium 121 corresponding to the acquired logical address information in the address mapping table and acquires the physical address information before update in the address mapping table. The update unit 115-2 compares the physical address information of the transfer source with the physical address information before update.

The update unit 115-2 determines whether the physical address information of the transfer source is identical to the physical address information before update (Step S45). When the physical address information of the transfer source is not identical to the physical address information before update (Step S45: No), the process of writing data which is requested to be written by the host apparatus to data with the same logical address and the transfer process overlap each other and a process of updating the address mapping table which is performed in the process of writing the data requested to be written by the host apparatus ends at least at the comparison time. Therefore, the process proceeds to Step S47.

When the physical address information of the transfer source is identical to the physical address information before update (Step S45: Yes), the process of updating the address mapping table which is performed in the process of writing the data requested to be written by the host apparatus does not start at least at the comparison time even when the process of writing the data which is requested to be written by the host apparatus to the data with the same logical address and the transfer process overlap each other. Therefore, the process proceeds to Step S46.

In Step S46, the update unit 115-2 updates the management information (Step S46). Specifically, the update unit 115-2 instructs the first access control unit 151 to perform a writing process such that the physical address information of the storage medium 121 indicated by the acquired logical address information is updated to the physical address information of the storage medium 121, which is a transfer destination, in the address mapping table. The first access control unit 151 updates (writes) the information registered in the address mapping table of the first memory 141 to the designated information.

In this embodiment, the physical address information of the storage medium 121 includes the block number, the page number, and the page offset. Therefore, the physical address information of the storage medium 121, which is a transfer destination, includes the block number of the memory cell group 202 designated by the transfer control unit 113-2, the page number to which data with the logical address is transferred, and a page offset to which the data with the logical address is transferred. The physical address information may be appropriately changed depending on various structures of the address mapping table.

In Step S47, the process is repeatedly performed, if necessary. Specifically, the transfer control unit 113-2 repeatedly performs a process group from Step S41 to Step S46 in a predetermined order of the writing stages of each memory cell group 202 in the block 201, if necessary. When there is no necessity to repeatedly perform the process, the process ends.

As described above, according to the first and second embodiments, it is possible to achieve a transfer process which prepares for necessary data at an appropriate timing and performs a reading and writing process for a semiconductor storage medium in an appropriate order.

A program executed by the storage device according to the first or second embodiment is incorporated into, for example, a ROM and is then provided.

The program executed by the storage device according to the first or second embodiment may be recorded as an installable or executable file on a computer-readable recording medium, such as a compact disk read only memory (CD-ROM), a flexible disk (FD), a compact disk recordable (CD-R), or a digital versatile disk (DVD), and then provided as a computer program product.

In addition, the program executed by the storage device according to the first or second embodiment may be stored in a computer connected to a network, such as the Internet, downloaded through the network, and then provided. Furthermore, the program executed by the storage device according to the first or second embodiment may be provided or distributed through the network, such as the Internet.

The program executed by the storage device according to the first or second embodiment causes the computer to function as each unit (the read control unit, the write control unit, the transfer control unit, the determining unit, the update unit, the reading unit, and the writing unit) of the storage device. A CPU of the computer may read the program from the computer-readable storage medium onto the main storage device to implement the functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A controller that is connected to an external storage device temporarily storing parts of data of a semiconductor storage device, and the controller controls access to the semiconductor storage device, which is configured to include a plurality of blocks, each of the plurality of blocks including N (N is an integer equal to or greater than 2) memory cell groups, each of the memory cell groups having a plurality of memory cells, and each of the plurality of blocks further including that the memory cells in a block are grouped into a plurality of pages, a size of each page of the plurality of pages being a predetermined unit storage area, wherein each of the memory cell groups of the block comprises two or more respective pages of the plurality of the pages, the controller comprising:

processing circuitry configured to:
perform a writing process transferring parts of the data of the semiconductor storage device from one location to another of the semiconductor storage device by transferring the parts of the data to the memory cell groups of a block of the semiconductor storage device, wherein (i) each part of the writing process includes P (P is an integer equal to or greater than 2) writing stages, the each part of the writing process corresponding to one of the memory cell groups, (ii) the writing stages are performed in a predetermined order, (iii) each writing stage includes at least one destination page, which is in a memory cell group that is a write target of the each writing stage, and (iv), for each of the writing stages, the writing process includes
determining, for a writing stage in which a given memory cell group is the write target of the writing stage, a first part of the data, wherein (i) the first part of the data corresponds to new required pages, (ii) the new required pages include pages required for the writing stage except pages determined to be required for prior writing stages of the writing process, and (iii) the determining of the first part of the data is performed before the writing stage to the given memory cell group starts,
reading the determined first part of the data from source pages of the semiconductor storage device and storing the read data in the external storage device, the reading of the determined first part of the data being performed before the writing stage to the given memory cell group starts,
performing the writing stage to the given memory cell group using the stored data in the external storage device as parts of the data for the pages required in the writing stage in which the given memory cell group is the write target; and
deallocate, after the writing stage is complete, a storage area of the external storage device storing the stored data except for a storage area of the external storage device corresponding to parts of the data for pages that are determined to be required in subsequent writing stages of the writing process, wherein
a capacity of the external storage device is three times or more in size than that of a cell group of the memory cell groups.

2. The controller according to claim 1, wherein the processing circuitry performs the deallocating of the storage area of the external storage device storing the stored data except for a storage area of the external storage device corresponding to parts of the data for pages that are determined to be required in subsequent writing stages of the writing process, before a process of reading data for the pages that are required in the subsequent writing stage starts after the writing stage is completed.

3. The controller according to claim 1, further comprising a management information storage that stores management information in which a logical address and a physical address of data stored in the semiconductor storage device are associated with each other, wherein the processing circuitry is configured to update the physical address of the management information associated with the logical address of the determined first part of the data to the physical address indicating a writing position of the data in the page associated with the given memory cell group after the last writing stage of the given memory cell group is completed.

4. The controller according to claim 3, wherein, after the last writing stage of a plurality of given memory cell groups is completed, the processing circuitry updates the physical addresses of pieces of data written in the pages associated with the plurality of given memory cell groups.

5. The controller according to claim 3, wherein the processing circuitry performs an access process to the semiconductor storage device and a process of updating the physical address while appropriately switching the processes.

6. The controller according to claim 3, wherein, when the physical address, which indicates the writing position of the data in the page associated with the memory cell group before the page associated with the given memory cell group is written, is identical to the physical address of the management information associated with the logical address of the data, the processing circuitry updates the physical address of the management information associated with the logical address of the data to the physical address indicating the writing position of the data in the page associated with the given memory cell group.

7. The controller according to claim 1, wherein the processing circuitry is further configured to:
receive a write request to write data to a storage device address which is address information that is converted into the logical address, from an external apparatus; and
perform the writing stage of the memory cell group so that the data corresponding to the write request is written to the page associated with the memory cell group.

8. The controller according to claim 7, wherein a block including the memory cell group to which the processing circuitry writes the data is different from a block including the given memory cell group.

9. The controller according to claim 7, wherein a block including the memory cell group to which the processing circuitry writes the data is the same as a block including the given memory cell group.

10. The controller according to claim 1, wherein the external storage device functions as a temporary buffer for the writing process transferring parts of the data within the semiconductor storage device.

11. A storage device, comprising:
an external storage device configured to store data;
a semiconductor storage device configured to include a plurality of blocks, each of the plurality of blocks including N (N is an integer equal to or greater than 2) memory cell groups, each of the memory cell groups having a plurality of memory cells, each of the plurality of blocks further including that the memory cells in a block are grouped into, and the semiconductor storage device being configured to output the data in units of a page, which is a predetermined unit storage area, wherein each of the memory cell groups of the block comprises two or more respective pages of the plurality of the pages; and
a controller configured to control access to the data of the semiconductor storage device, and, for a block of the plurality of blocks, the controller controls the access to the data by
writing the data to the block using a writing process, transferring parts of the data from one location to another of the semiconductor storage device by transferring the parts of the data to the memory cell groups of a block, wherein (i) each part of the writing process includes P (P is an integer equal to or greater than 2) writing stages, the each part of the writing process corresponding to one of the memory cell groups, (ii) the writing stages are performed in a predetermined order, (iii) each writing stage includes at least one destination page, which is in a memory cell group that is a write target of the each writing stage, and (iv), for each of the writing stages, the writing process includes
determining, for a writing stage in which a given memory cell group is the write target of the writing stage, a first part of the data, wherein (i) the first part of the data corresponds to new required pages, and (ii) the new required pages include pages required for the writing stage except pages determined to be required for prior writing stages of the writing process,
reading the determined first part of the data from source pages of the semiconductor storage device and storing the read data in the external storage device, the reading of the determined first part of the data being performed before the writing stage starts,
performing the writing stage to the given memory cell group using the stored data in the external storage device as parts of the data for the pages required in the writing stage in which the given memory cell group is the write target, and
deallocating, after each the writing stage is complete, a storage area of the external storage device storing the stored data except for a storage area of the external storage device corresponding to parts of the data for pages that are determined to be required in subsequent writing stages of the writing process, wherein
a capacity of the external storage device is three times or more in size than that of a cell group of the memory cell groups.

12. A non-transitory computer-readable recording medium containing a program executed by a computer that is connected to an external storage device temporarily storing parts of data of a semiconductor storage device, and the computer controls access to a semiconductor storage device, which is configured to include a plurality of blocks, each of the plurality of blocks including N (N is an integer equal to or greater than 2) memory cell groups, each of the memory cell groups having a plurality of memory cells, and each of the plurality of blocks further including that the memory cells in a block are grouped into the memory cells into a plurality of pages each of which is includes another plurality of memory cells, a size of each page of the plurality of pages being a predetermined unit storage area, wherein each of the memory cell groups of the block comprises two or more respective pages of the plurality of the pages, the program causing the computer to execute:
a writing process transferring parts of the data from one location to another of the semiconductor storage device by transferring the parts of the data to the memory cell groups of a block, wherein (i) each part of the writing process includes P (P is an integer equal to or greater than 2) writing stages, the each part of the writing process corresponding to one of the memory cell groups, (ii) the writing stages are performed in a predetermined order, (iii) each writing stage includes at least one destination page, which is in a memory cell group that is a write target of the each writing stage, and (iv), for each of the writing stages, the writing process includes determining, for a writing stage in which a given memory cell group is the write target of the writing stage, a first part of the data, wherein (i) the first part of the data corresponds to new required pages, and (ii) the new required pages include pages required for the writing stage except pages determined to be required for prior writing stages, reading the determined first part of the data from source pages of the semiconductor storage device, storing the read data in the external storage device before the writing stage, performing each of the writing stages of the memory cell group using the data stored in the external storage device as data for the page target pages of the writing stages of the memory cell group when each of the writing stages is performed, and deallocating, after the writing stage is complete, a storage area of the external storage device storing the stored data except for a storage area of the external storage device corresponding to parts of the data for pages that are determined to be required in subsequent writing stages of the writing process, wherein a capacity of the external storage device is three times or more in size than that of a cell group of the memory cell groups.

13. A controller that is controls access to a first storage device, which is configured to include a plurality of blocks, each of the plurality of blocks including N (N is an integer equal to or greater than 2) memory cell groups, each of the memory cell groups having a plurality of memory cells, and each of the plurality of blocks further including that the memory cells in a block are grouped into a plurality of pages, a size of each page of the plurality of pages being a predetermined unit storage area, each of the memory cell groups being associated with two or more respective pages of the plurality of the pages, the controller comprising:

processing circuitry configured to perform a writing process transferring parts of the data of the first storage device from one location to another of the first storage device by transferring the parts of the data to for each of the memory cell groups of a block of the first storage device, wherein (i) each part of the writing process includes P (P is an integer equal to or greater than 2) writing stages, the each part of the writing process corresponding to one of the memory cell groups, (ii) the writing stages being performed in a predetermined order, (iii) each writing stage includes at least one destination page, which is in a memory cell group that is a write target of the each writing stage, and (iv), for each of the writing stages being performed by determining, for a writing stage in which a given memory cell group is the write target of the writing stage, a first part of the data, wherein (i) the first part of the data corresponds to new required pages, and (ii) the new required pages include pages required for the writing stage except pages determined to be required for prior writing stages of the writing process, reading the determined first part of the data from the first storage device and storing the read data in a second storage device, the reading of the determined first part of the data being performed before the writing stage to the given memory cell group starts, performing each of the writing stage to stages using the stored data in the second storage device as parts of the data for the pages required in the writing stage; and deallocating, after the writing stage is complete, a storage area of the second storage device storing the stored data except for a storage area of the second storage device corresponding to parts of the data for pages that are determined to be required in subsequent writing stages of the writing process, wherein a capacity of the second storage device is three times or more in size than that of a cell group of the memory cell.

14. The controller according to claim 13, wherein when a subsequent writing stage requires the data stored in the storage area, the processing circuitry delays a deallocation of the storage area until the subsequent writing stage is completed.

15. The controller according to claim 14, wherein when the storage area of the second storage device storing the first part of the determined data is not deallocated, the processing circuitry does not read, during the subsequent writing stages, the determined first part of the data from the first storage device.

* * * * *